US010944830B2

(12) United States Patent
Scanlin et al.

(10) Patent No.: US 10,944,830 B2
(45) Date of Patent: *Mar. 9, 2021

(54) SYSTEM AND METHOD FOR SMART BUILDING CONTROL USING DIRECTIONAL OCCUPANCY SENSORS

(71) Applicant: Scanalytics, Inc., Milwaukee, WI (US)

(72) Inventors: Joseph Scanlin, Milwaukee, WI (US); David M. Webber, Madison, WI (US)

(73) Assignee: Scanalytics, Inc., Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/586,789

(22) Filed: Sep. 27, 2019

(65) Prior Publication Data

US 2020/0028915 A1 Jan. 23, 2020

Related U.S. Application Data

(63) Continuation of application No. 16/234,498, filed on Dec. 27, 2018, now Pat. No. 10,469,590.

(Continued)

(51) Int. Cl.
*H04L 29/08* (2006.01)
*H04W 4/029* (2018.01)
(Continued)

(52) U.S. Cl.
CPC ............ *H04L 67/125* (2013.01); *F24F 11/63* (2018.01); *G05B 15/02* (2013.01); *G05B 19/042* (2013.01);
(Continued)

(58) Field of Classification Search
None
See application file for complete search history.

(56) References Cited

U.S. PATENT DOCUMENTS 6,515,586 B1    2/2003  Wymore
6,545,706 B1 *  4/2003  Edwards ............... G06T 7/246
                                                       348/169

(Continued)

OTHER PUBLICATIONS

Office Action dated Mar. 31, 2020 in connection with U.S. Appl. No. 16/234,232, 44 pages.

(Continued)

*Primary Examiner* — Fekadeselassie Girma

(57) ABSTRACT

A method includes receiving a first plurality of electrical signals from presence sensors disposed in a physical space, generating background sensor values mapped to a coordinate system for the physical space, receiving, a second plurality of electrical signals from the presence sensors, and generating, based on the second plurality of electrical signals from the presence sensors, sensor values mapped to the coordinate system for the physical space at the first time and the second time. The method further includes subtracting the background sensor values from the sensor values mapped to the coordinate system to obtain measurement data, associating the measurement data with a moving object belonging to an object class, determining a track, based on the measurement data, the track comprising a link between a first node and another node in the coordinate system for the physical space; and outputting, a control signal associated with the determined track.

6 Claims, 16 Drawing Sheets

Related U.S. Application Data

(60) Provisional application No. 62/644,130, filed on Mar. 16, 2018, provisional application No. 62/615,310, filed on Jan. 9, 2018, provisional application No. 62/612,959, filed on Jan. 2, 2018, provisional application No. 62/646,537, filed on Mar. 22, 2018.

(51) Int. Cl.

| | | |
|---|---|---|
| *G05B 15/02* | (2006.01) | |
| *F24F 11/63* | (2018.01) | |
| *G08B 21/22* | (2006.01) | |
| *G05B 19/042* | (2006.01) | |
| *F24F 120/10* | (2018.01) | |
| *F24F 120/12* | (2018.01) | |

(52) U.S. Cl.
CPC ............ *G08B 21/22* (2013.01); *H04W 4/029* (2018.02); *F24F 2120/10* (2018.01); *F24F 2120/12* (2018.01); *G05B 2219/2614* (2013.01)

(56) References Cited

U.S. PATENT DOCUMENTS

| | | | | |
|---|---|---|---|---|
| 7,957,557 | B2* | 6/2011 | Otsu | G06K 9/32 |
| | | | | 382/103 |
| 8,471,848 | B2* | 6/2013 | Tschesnok | G06T 7/564 |
| | | | | 345/420 |
| 8,854,249 | B2* | 10/2014 | Paglieroni | G01S 13/003 |
| | | | | 342/22 |
| 9,094,615 | B2* | 7/2015 | Aman | H04N 5/23238 |
| 9,420,950 | B2* | 8/2016 | Gao | G02B 27/0093 |
| 9,996,748 | B2* | 6/2018 | Way | G06T 5/50 |
| 10,264,213 | B1* | 4/2019 | Sculley | G06F 3/04817 |
| 10,311,551 | B2* | 6/2019 | Menon Gopalakrishna | |
| | | | | B61L 15/0072 |
| 2007/0069021 | A1 | 3/2007 | Elrod et al. | |
| 2007/0090969 | A1 | 4/2007 | Eiza | |
| 2009/0002144 | A1 | 1/2009 | Bernard et al. | |
| 2009/0234810 | A1 | 9/2009 | Angell et al. | |
| 2011/0004435 | A1 | 1/2011 | Lindstrom et al. | |
| 2011/0205022 | A1* | 8/2011 | Cavallaro | G01S 17/42 |
| | | | | 340/8.1 |
| 2012/0046044 | A1* | 2/2012 | Jamtgaard | H04N 7/181 |
| | | | | 455/456.1 |
| 2012/0314081 | A1 | 12/2012 | Kleihorst et al. | |
| 2015/0025690 | A1 | 1/2015 | Abuelsaad et al. | |
| 2015/0193936 | A1* | 7/2015 | Warzelhan | G08B 13/19615 |
| | | | | 382/103 |
| 2015/0204556 | A1 | 7/2015 | Kusukame et al. | |
| 2015/0256355 | A1 | 9/2015 | Pera et al. | |
| 2016/0056629 | A1 | 2/2016 | Baker et al. | |
| 2016/0132030 | A1 | 5/2016 | Marti et al. | |
| 2016/0192164 | A1* | 6/2016 | Scully | G08B 25/016 |
| | | | | 455/404.2 |
| 2016/0198296 | A1 | 7/2016 | Jung et al. | |
| 2017/0147767 | A1 | 5/2017 | Buck et al. | |
| 2017/0161987 | A1* | 6/2017 | Bulzacki | G06K 9/0053 |
| 2017/0206772 | A1 | 7/2017 | Klimanis et al. | |
| 2017/0213459 | A1 | 7/2017 | Ogaz | |
| 2017/0350615 | A1 | 12/2017 | Ashar | |
| 2017/0372223 | A1 | 12/2017 | Vaughn et al. | |
| 2018/0143321 | A1 | 5/2018 | Skowronek et al. | |
| 2018/0143601 | A1 | 5/2018 | Chavan et al. | |
| 2018/0157930 | A1* | 6/2018 | Rutschman | G06K 9/4609 |
| 2018/0299153 | A1 | 10/2018 | Ajax et al. | |
| 2018/0305123 | A1* | 10/2018 | Lert, Jr. | G05D 1/0088 |
| 2018/0313558 | A1 | 11/2018 | Byers et al. | |
| 2018/0322759 | A1* | 11/2018 | Devdas | A61B 5/0024 |
| 2019/0101306 | A1* | 4/2019 | Giorgi | F24F 11/74 |
| 2019/0122381 | A1* | 4/2019 | Long | G06K 9/00993 |

OTHER PUBLICATIONS

Office Action dated Jan. 14, 2021 in connection with U.S. Appl. No. 16/234,194, 34 pages.

\* cited by examiner

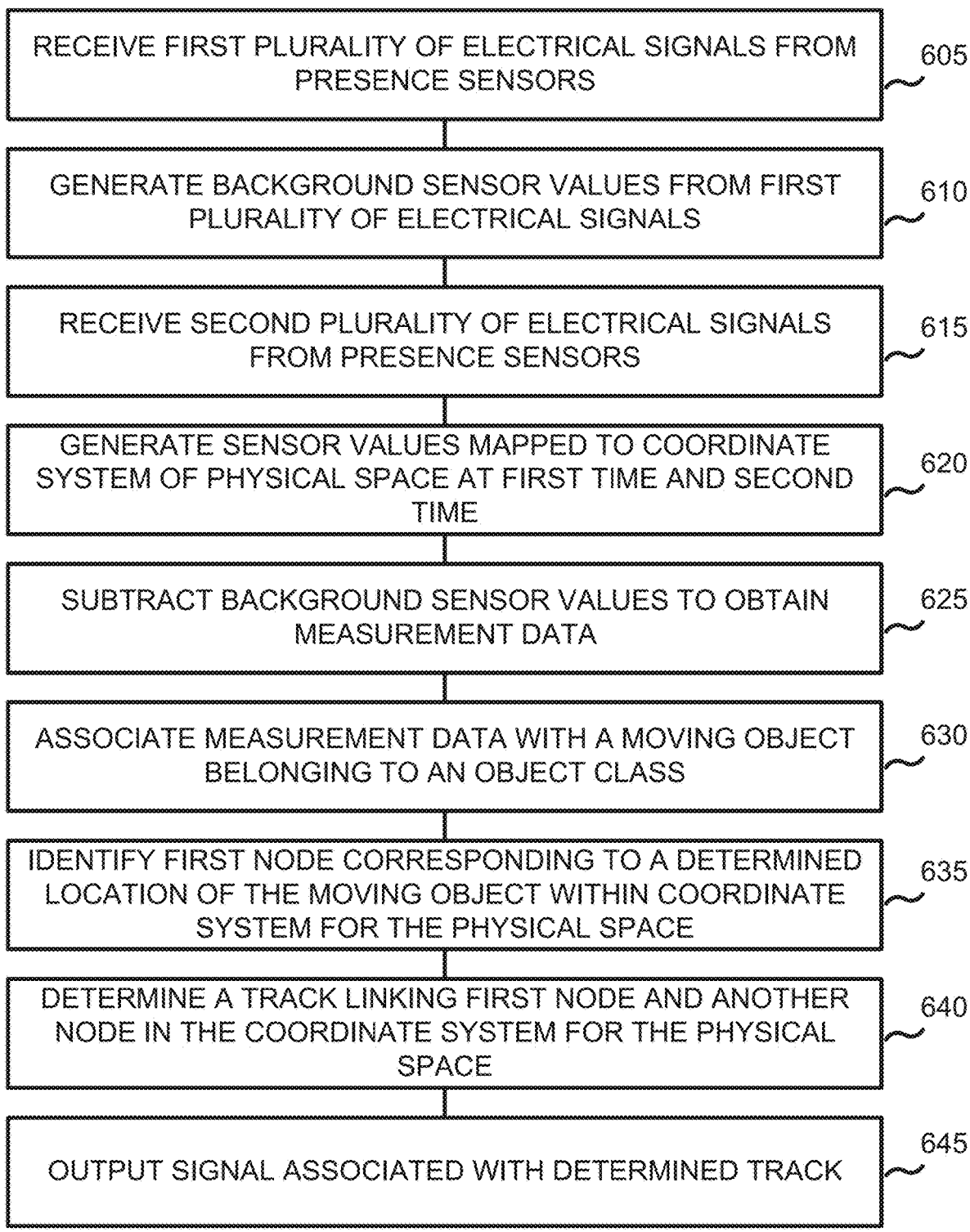

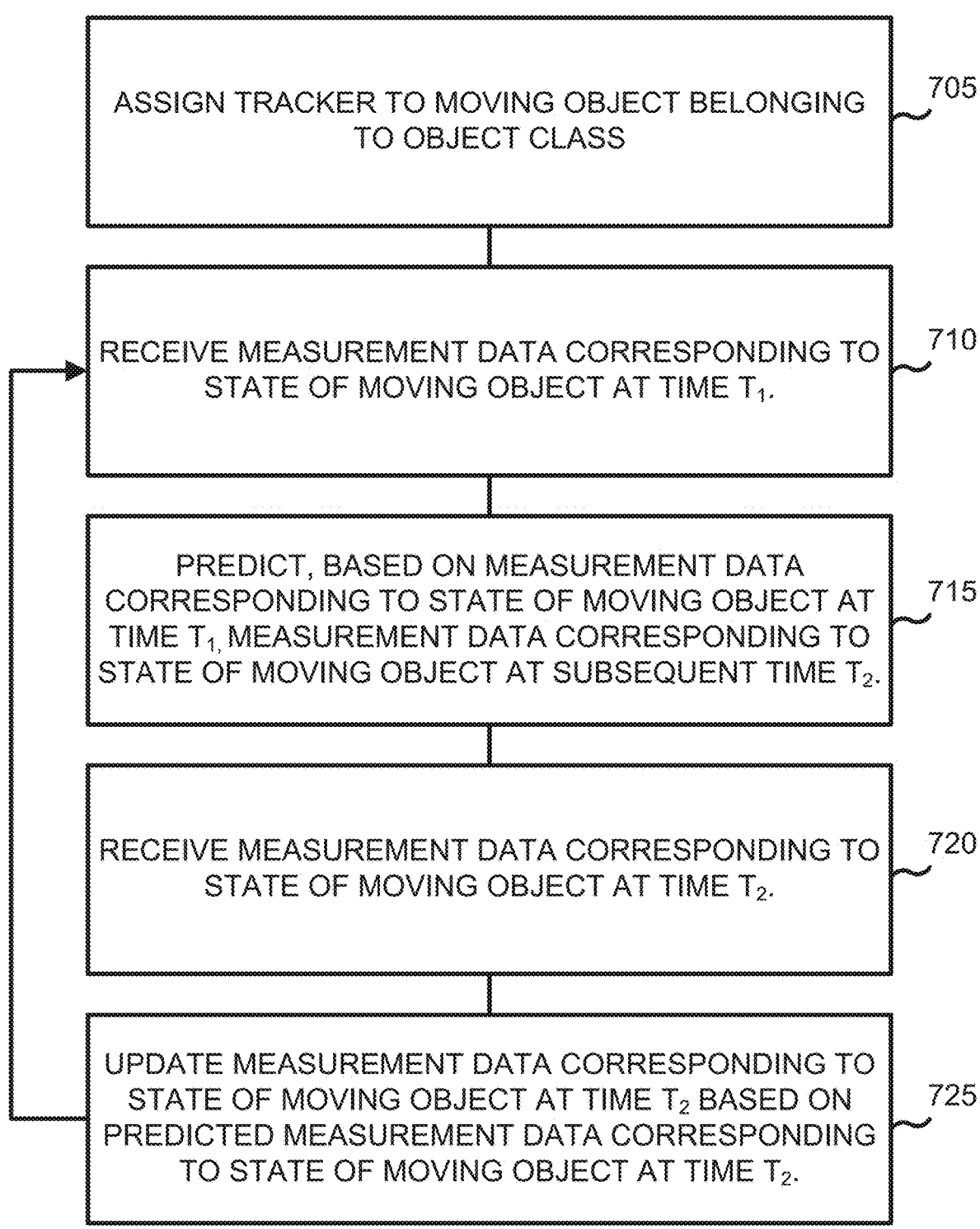

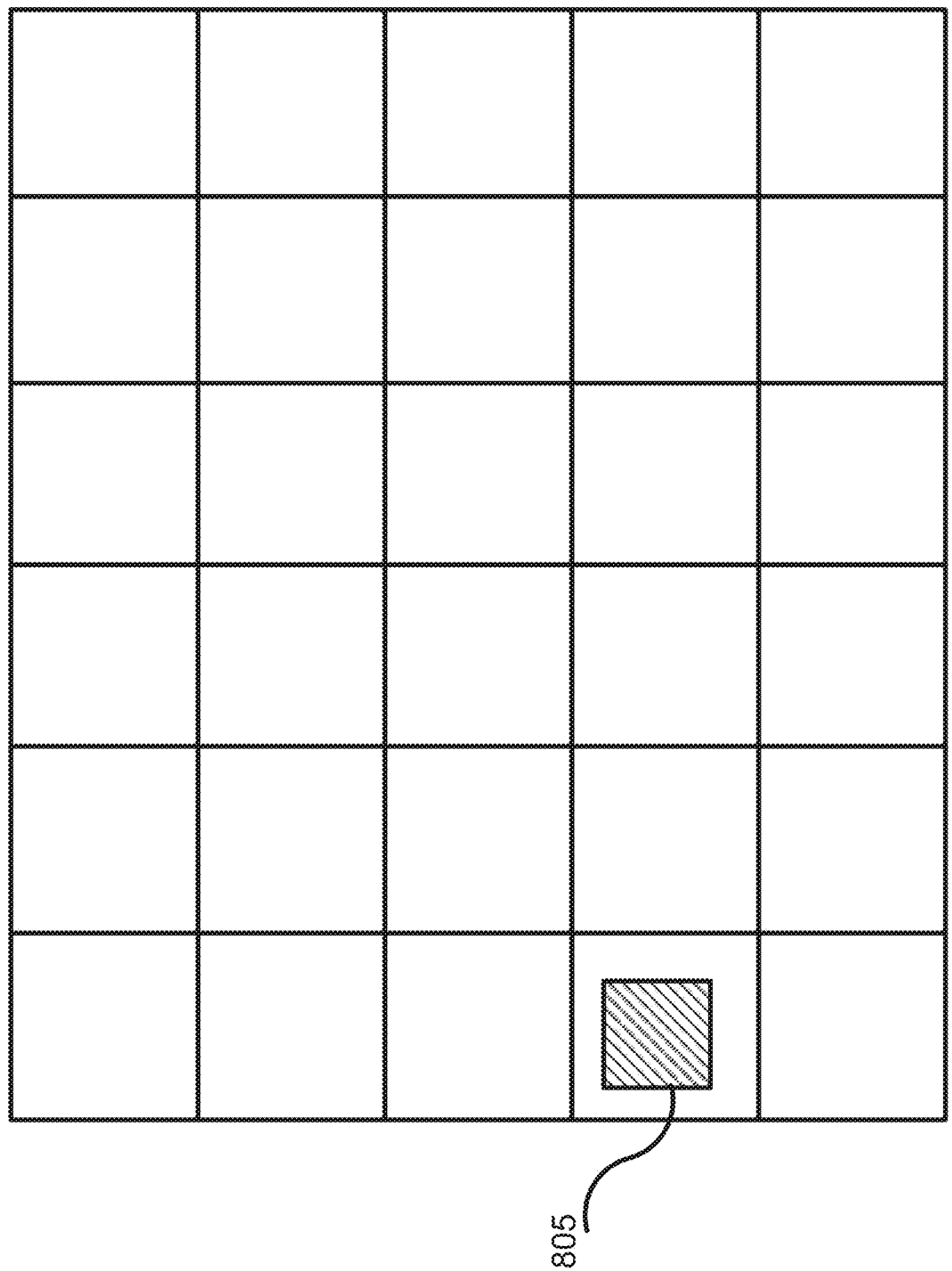

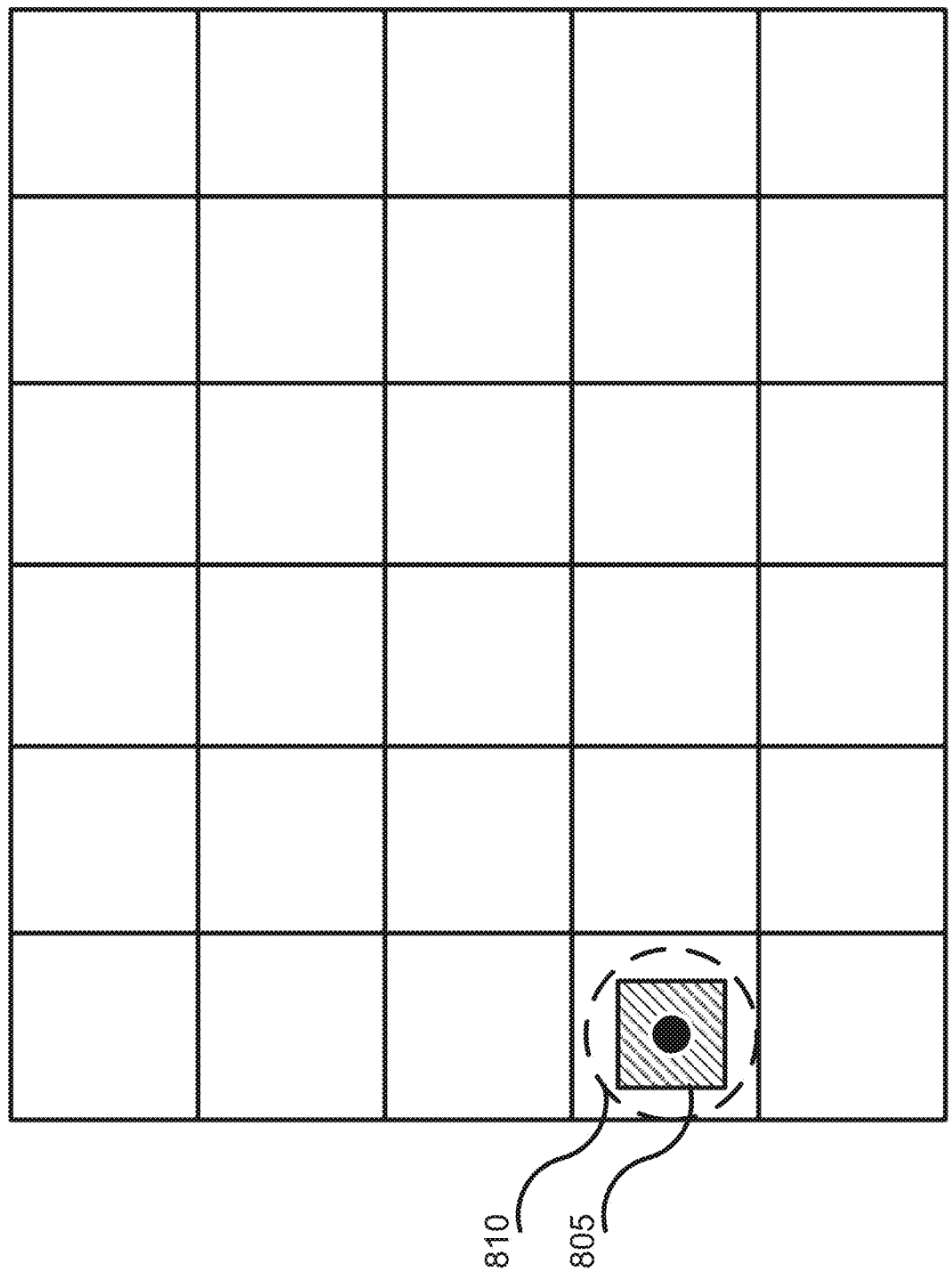

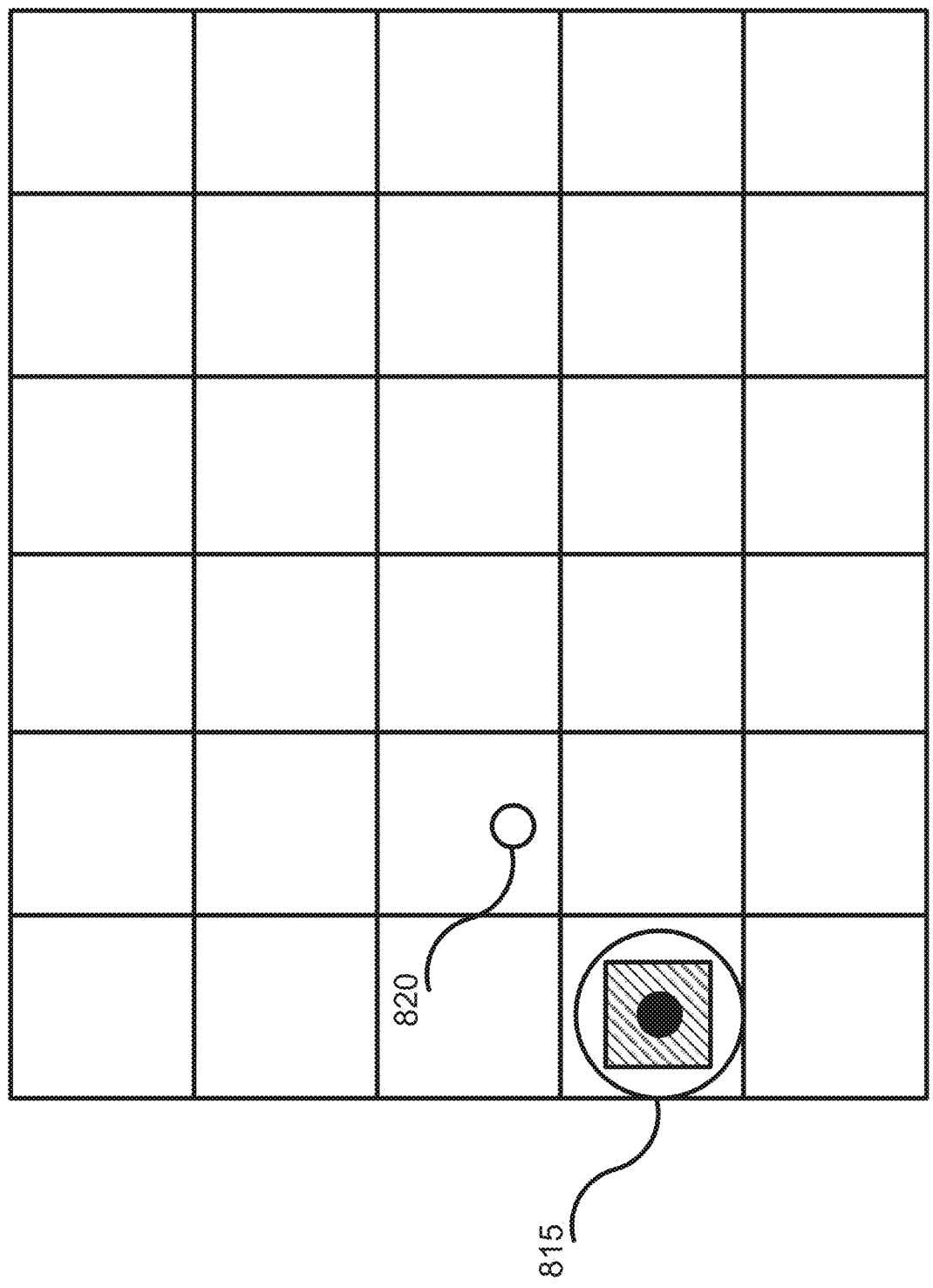

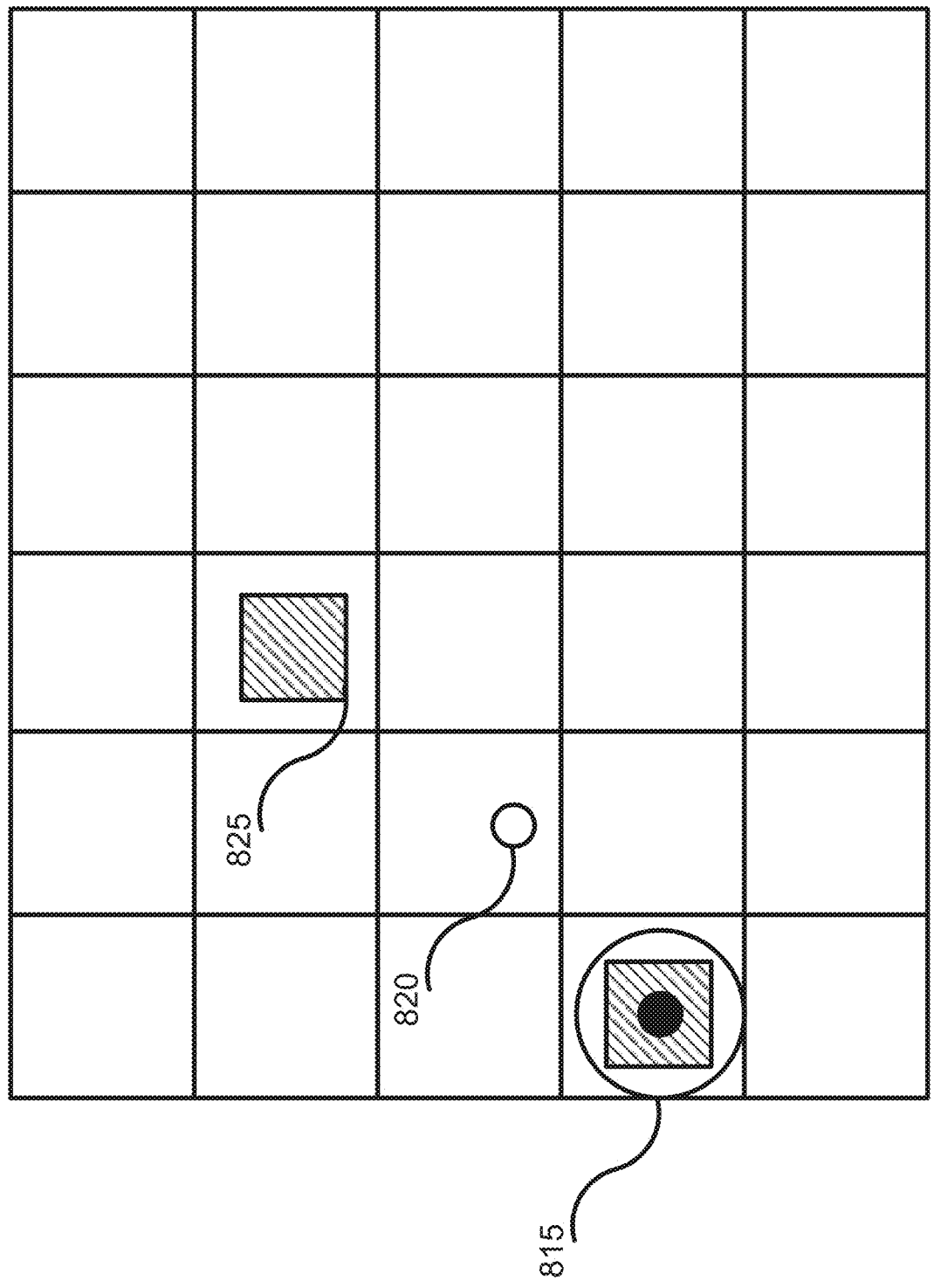

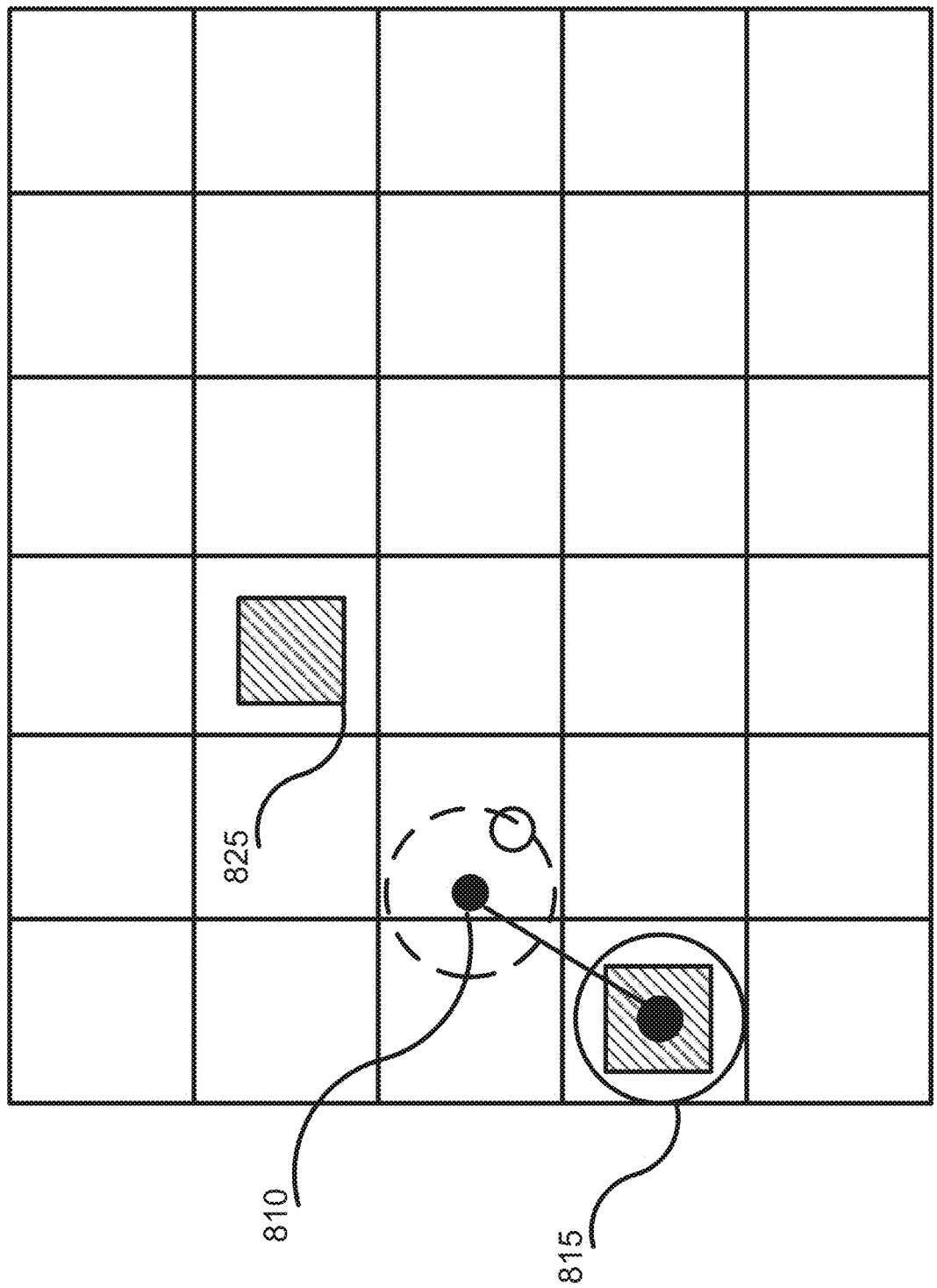

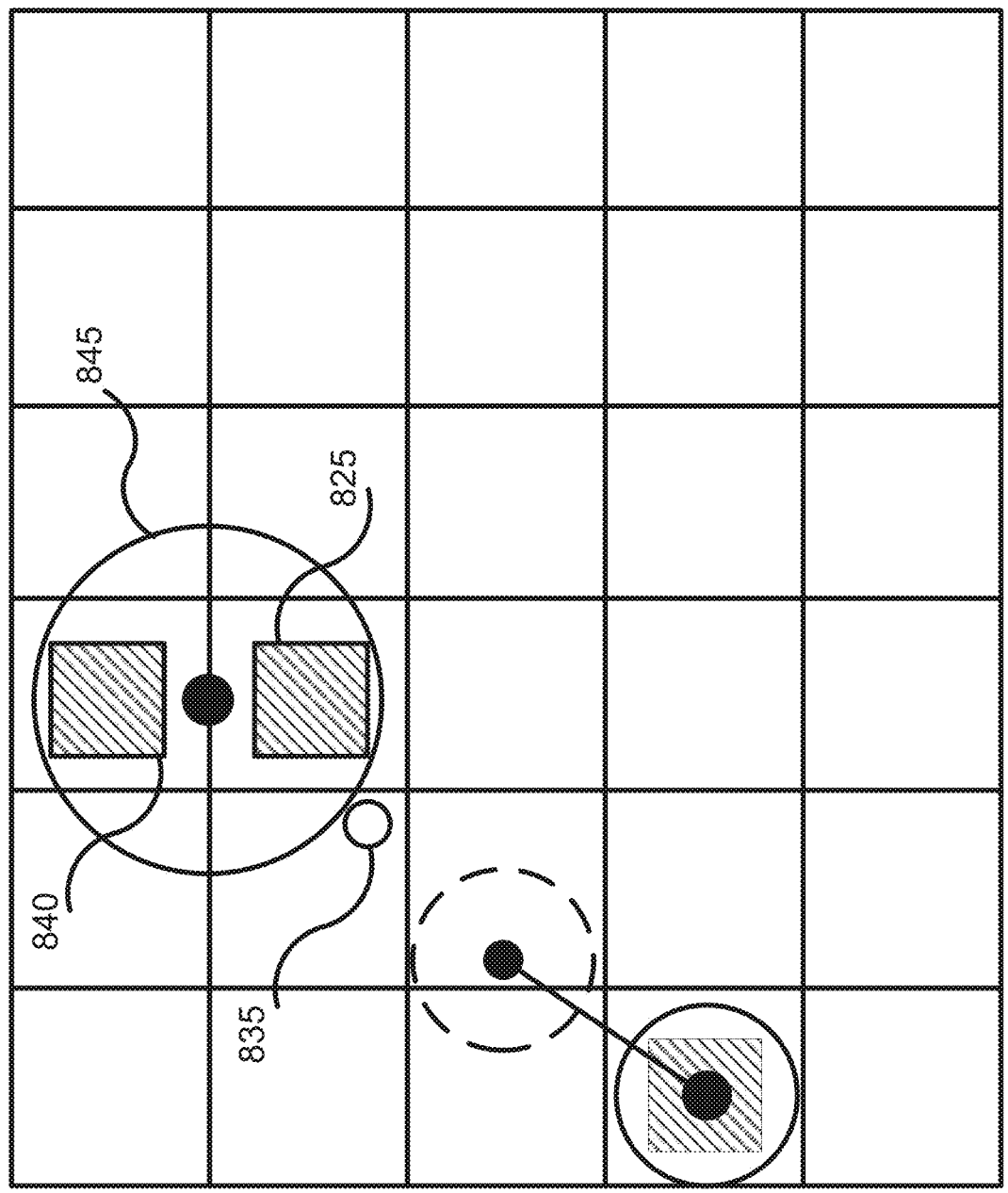

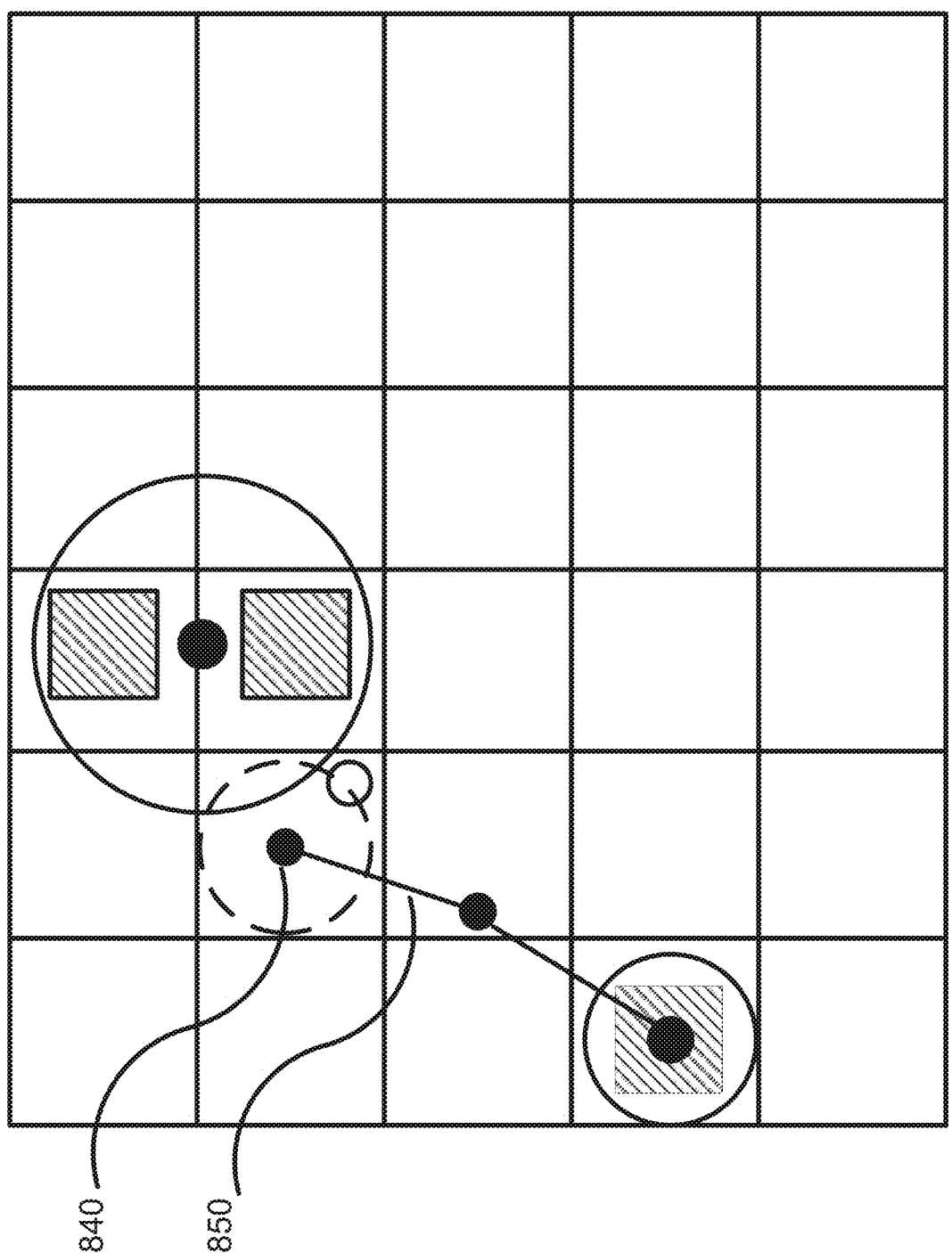

SYSTEM AND METHOD FOR SMART BUILDING CONTROL USING DIRECTIONAL OCCUPANCY SENSORS

CROSS-REFERENCE TO RELATED APPLICATION AND CLAIM OF PRIORITY

This application is a continuation of U.S. patent application Ser. No. 16/234,498 filed Dec. 27, 2018, which is related to and claims priority under 35 U.S.C. § 120 from U.S. Provisional Application No. 62/615,310 entitled "Data Acquisition, Bundling, and Processing" filed on Jan. 9, 2018, U.S. Provisional Application No. 62/612,959 entitled "Self-Configuring Modular Surface Sensors Analytics System" filed on Jan. 2, 2018, U.S. Provisional Application No. 62/646,537 entitled "System and Method for Smart Building Control Using Multidimensional Presence Sensor Arrays" filed on Mar. 22, 2018, and U.S. Provisional Application No. 62/644,130 entitled "System and Method for Smart Building Control Using Directional Occupancy Sensors," filed on Mar. 16, 2018, the disclosures of which are incorporated by reference herein in their entireties.

TECHNICAL FIELD

This disclosure relates generally to sensors and control systems for physical spaces. More specifically, this disclosure relates to a system and method for smart building control using directional occupancy sensing.

BACKGROUND

"Smart Buildings," or buildings comprising physical spaces whose environmental control systems, such as lights, HVAC systems, and physical features (for example, ceiling fans or window shades) operate, at least in part, based on control inputs generated by the computerized application of predetermined rules to sensor data, offer tremendous promise in terms of improving how humans use physical spaces. For example, truly intelligent control of heating and lighting systems offers the possibility of significant improvements in energy efficiency beyond those attainable through passive structural improvements such as better insulation. However, a "smart building" is only as "smart" as the sensors are able to provide accurate and meaningful inputs to the algorithms for controlling parameters of the building's physical spaces. Embodiments according to this disclosure address technical problems associated with generating truly "smart" control inputs for environmental control systems.

SUMMARY

This disclosure provides a system and method for smart building control using directional occupancy sensing.

In a first embodiment, a method of operating a master control device includes receiving, at an input-output interface of the master control device, a first plurality of electrical signals from presence sensors disposed in a physical space, the presence sensors associated with a coordinate system for the physical space, the master control device comprising a processor, a memory and the input-output interface. The method further includes generating, based on the first plurality of electrical signals from the presence sensors, background sensor values mapped to a coordinate system for the physical space, receiving, at the input-output interface of the master control device, a second plurality of electrical signals from the presence sensors, the second plurality of electrical signals received from at a first time and a second time, generating, based on the second plurality of electrical signals from the presence sensors, sensor values mapped to the coordinate system for the physical space at the first time and the second time, and subtracting the background sensor values from the sensor values mapped to the coordinate system at the first time and the second time to obtain measurement data. Additionally, the method includes associating the measurement data with a moving object belonging to an object class, identifying, based on the measurement data, a first node corresponding to a determined location of the moving object within the coordinate system for the physical space, determining a track, based on the measurement data, the track comprising a link between a first node and another node in the coordinate system for the physical space and outputting, via the input-output interface of the master control device, a signal associated with the determined track.

In a second embodiment, a master control device includes an input-output interface, a processor and a memory containing instructions, which when executed by the processor, cause the master control device to receive, at the input-output interface of the master control device, a first plurality of electrical signals from presence sensors disposed in a physical space, the presence sensors associated with a coordinate system for the physical space, the master control device comprising a processor, a memory and, the input-output interface. The instructions, when executed by the processor, further cause the master control device to generate, based on the first plurality of electrical signals from the presence sensors, background sensor values mapped to a coordinate system for the physical space, receive, at the input-output interface of the master control device, a second plurality of electrical signals from the presence sensors, the second plurality of electrical signals received from at a first time and a second time, generate, based on the second plurality of electrical signals from the presence sensors, sensor values mapped to the coordinate system for the physical space at the first time and the second time, and subtract the background sensor values from the sensor values mapped to the coordinate system at the first time and the second time to obtain measurement data. The instructions, when executed by the processor, still further cause the master control device to associate the measurement data with a moving object belonging to an object class, identify, based on the measurement data, a first node corresponding to a determined location of the moving object within the coordinate system for the physical space, determine a track, based on the measurement data, the track comprising a link between a first node and another node in the coordinate system for the physical space and output, via the input-output interface of the master control device, a signal associated with the determined track.

In a third embodiment, a computer program product includes program code, which when executed by a processor, causes a master control device to receive, at the input-output interface of the master control device, a first plurality of electrical signals from presence sensors disposed in a physical space, the presence sensors associated with a coordinate system for the physical space, the master control device comprising a processor, a memory and the input-output interface. Additionally, the program code, when executed by the processor, causes the master control device to generate, based on the first plurality of electrical signals from the presence sensors, background sensor values mapped to a coordinate system for the physical space, receive, at the input-output interface of the master control device, a second plurality of electrical signals from the presence sensors, the second plurality of electrical signals received from at a first time and a second time, generate, based on the second plurality of electrical signals from the presence sensors, sensor values mapped to the coordinate system for the physical space at the first time and the second time, and subtract the background sensor values from the sensor values mapped to the coordinate system at the first time and the second time to obtain measurement data. Further, the program code, when executed by the processor, causes the master control device to associate the measurement data with a moving object belonging to an object class, identify, based on the measurement data, a first node corresponding to a determined location of the moving object within the coordinate system for the physical space, determine a track, based on the measurement data, the track comprising a link between a first node and another node in the coordinate system for the physical space and output, via the input-output interface of the master control device, a signal associated with the determined track.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 6 illustrates operations of a method of determining tracks associated with moving occupants of a physical space according to embodiments of this disclosure;

FIG. 7 illustrates operations of a Kalman fitter according to embodiments of this disclosure; and FIGS. 8A-8I illustrate aspects of a method for determining tracks from presence sensor data according to embodiments of this disclosure.

DETAILED DESCRIPTION

FIGS. 1 through 8I, discussed below, and the various embodiments used to describe the principles of this disclosure in this patent document are by way of illustration only and should not be construed in any way to limit the scope of the disclosure.

Embodiments as disclosed herein relate to systems and methods for smart building control using directional occupancy sensing. The advent of the internet of things and development of physical spaces whose environmental control systems (for example, lights and HVAC systems) can be controlled using a broad spectrum of sensor data collected within the physical space presents many opportunities to make buildings "smarter," in the sense of being attuned with, and responsive to, the needs and priorities of the buildings' human occupants. Effective integration of sensor technology and machine intelligence for processing and understanding the sensor data presents opportunities for meaningful improvements across a wide range of building functionalities. For example, such integration can improve the efficiency of a building (for example, by focusing heating and cooling resources on the regions of a building that have the most people), improve a building's safety (for example, by performing footstep analysis to identify when an occupant of a building has fallen or stopped walking under circumstances suggesting concern, and extend the life cycle of a building (for example, by collecting data as to loading and use stress over a building's lifespan).

Realizing the full potential of a "smart building" to learn about its occupants and control itself in response to, and in anticipation of, its occupants' needs is enhanced when data regarding a building's utilization is collected from sources that are a constant across the building's lifecycle, and which capture all, or almost all, of the relevant occupant usage data.

The floor of a building is one example of a source of relevant occupant data for the entirety of the building's life. Walls can be knocked down and moved over the course of a building's lifetime, but the floor generally remains a structural constant. Similarly, barring unforeseeable changes in human locomotion, humans can be expected to generate measureable interactions with buildings through their footsteps on buildings' floors. Embodiments according to the present disclosure help realize the potential of the "smart building" by providing, amongst other things, control inputs for a building's environmental control systems using directional occupancy sensing based on occupants' interaction with building surfaces, including, without limitation, floors.

Figure 1:
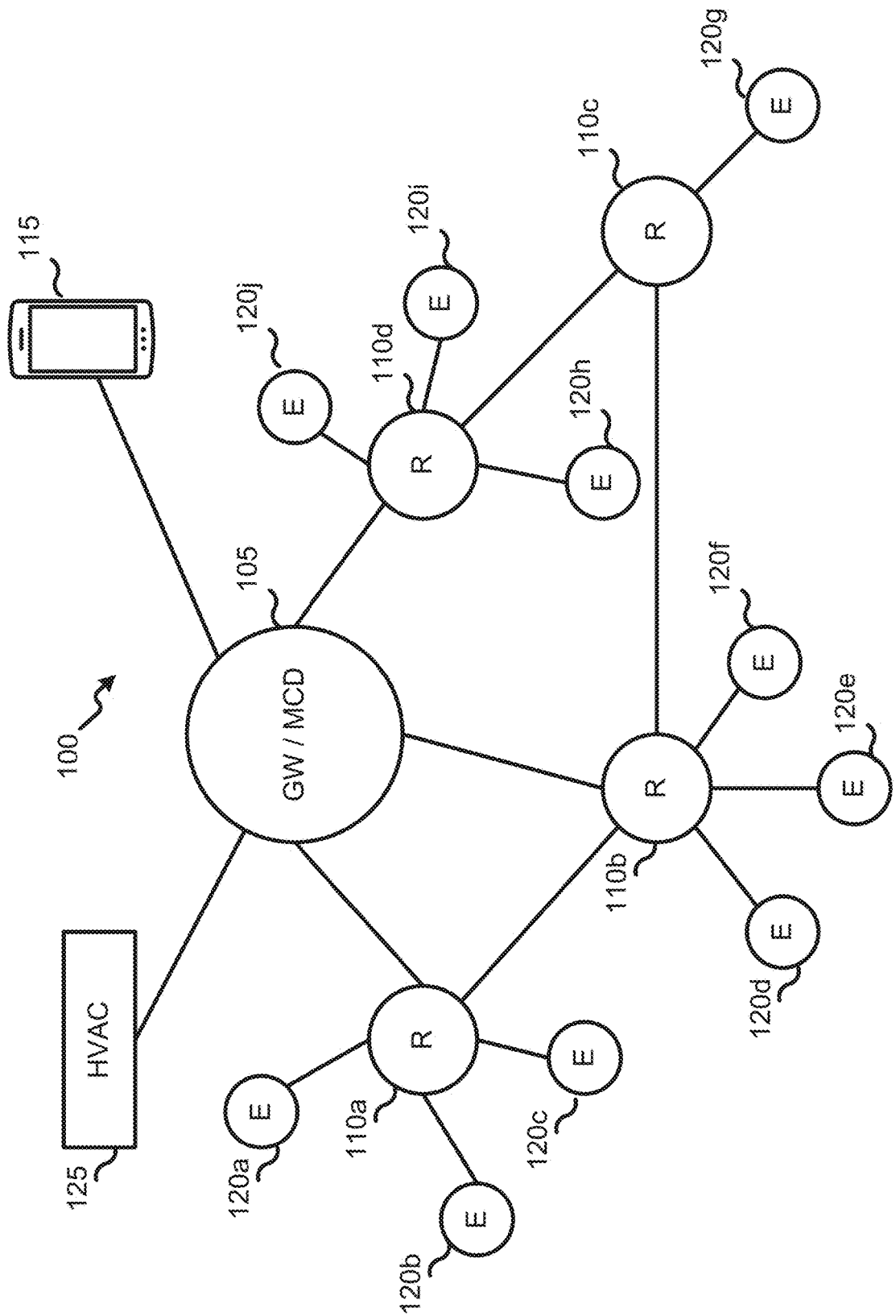
FIG. 1 illustrates a network context for implementing a system and method for smart building control using directional occupancy sensing according to embodiments of this disclosure.

FIG. 1 illustrates an example of a network context 100 for implementing a system and method for smart building control using directional occupancy sensing according to some embodiments of this disclosure. The embodiment of the network context 100 shown in FIG. 1 is for illustration only and other embodiments could be used without departing from the scope of the present disclosure.

In the non-limiting example shown in FIG. 1, a network context 100 according to certain embodiments of this disclosure includes a master control device 105 (sometimes referred to as a gateway, one or more routers 110a, 110b, 110c, 110d, a client device 115 providing a user interface, a plurality of end devices 120a-j in a physical space, and one or more appliances or features of a physical space receiving control signals (for example, HVAC system 125) from master control device 105.

According to certain embodiments, master control device 105 is embodied on a low power processing platform, such as a development board running an ARM CORTEX' processor. Alternatively, master control device 105 may be implemented on a larger computing platform, such as a notebook computer, a server computer, or a tablet comprising a memory, a processor, an input output interface, an analog to digital converter, and send and receive circuitry that includes a network interface and supports multiple communication protocols, including without limitation, Wi-Fi on the 900 MHz, 2.4 GHz and 5.0 GHz bands. According to further embodiments, master control device also supports communications using the ZIGBEE protocol and AES-128 encryption between devices in the network, including without limitation, routers 110a-110d, end devices 120a-j, client device 115 and HVAC system 125.

As will be described in greater detail herein, the memory of master control device 105 contains instructions, which when executed by the processor, cause the master control device to receive signals from end devices 120a-j, determine tracks associated with moving occupants of a physical space based on the received signals, and output signals for controlling appliances and features of the physical space based on the determined tracks.

While in the non-limiting example shown in FIG. 1, master control device 105 is shown as embodied on a single, physical computing platform (such as a server or notebook), which is communicatively connected to other actors within network context 100 using various wireless communication protocols, numerous other embodiments are possible and within the intended scope of this disclosure. For example, the operations carried out by master control device 105 in the embodiment shown in FIG. 1, can, in other embodiments, be performed on multiple machines, or by a different machine within network context 100, such as client device 115 or one of end devices 120a-j. Additionally, according to some embodiments, master control device 105 may be embodied on one or more virtual machines.

According to some embodiments, each router of routers 110a-110d is a wireless router providing a Wi-Fi link between master control device 105 and each of end devices 120a-120j. In the non-limiting example shown in FIG. 1, each of routers 110a-110d support communications using, without limitation, the ZIGBEE, BLUETOOTH, BLUETOOTH Low Energy (BLE) and Wi-Fi communication protocols in the 900 MHz, 2.4 GHz and 5.0 GHz bands. Alternatively, in other embodiments, routers 110a-110d connect to one or more devices within network context 100 over a wired connection and communicate using wired communication protocols, such as Ethernet networking protocols. Additionally, each of routers 110a-110d may be connected to one another, as shown in FIG. 1 to form a mesh network.

According to various embodiments, client device 115 is a smartphone providing a user interface for, without limitation, receiving information regarding determined tracks in the physical space, providing visualizations of determined tracks in the physical space, and controlling the transmission of control signals from master control device 105 to appliances and devices in the physical space (such as HVAC system 125) based on tracks determined by master control device 105.

In the non-limiting example shown in FIG. 1, each end device of end devices 120a-120j comprises a floor mounted presence sensor capable of collecting floor contact data from within the physical space at predetermined intervals. According to some embodiments, the predetermined intervals at which floor contact data is collected corresponds to a scan rate that can be configured at master control device 105 or via a user interface of client device 115. Further, according to some embodiments, each end device of end devices 120a-120j is embodied on a low-power general computing device such as a development board powered by an energy efficient processor, such as the INTEL ATOM' processor. According to some embodiments, the presence sensor is a membrane switch, resistive sensor, piezoelectric sensor or capacitive sensor that, when contacted, produces or changes an electrical signal, from which a value along one or more coordinate axes assigned to the physical space can be mapped. According to some embodiments (for example, embodiments using membrane switches or certain capacitive sensors), the presence sensors of end devices 120a-120j detect the presence or absence of contact with the floor. According to some embodiments (for example, with the resistive sensor shown in FIG. 3), the presence sensors of end devices 120a-120j produce an electric signal correlating to a pressure applied to the sensor. In certain embodiments, each of end devices 120a-120j also include an analog-to-digital converter ("A/D") to digitize the electrical signals. Further end devices 120a-120j may include a memory, a processor and send and receive circuitry to provide the electrical signals from the presence sensors or digitizations thereof to routers 110a-110d or master control device 105. According to some embodiments, the send and receive circuitry of end devices 120a-120j includes a network interface supporting one or more wired or wireless communication protocols, including without limitation, Ethernet, Zigbee, Wi-Fi, Bluetooth and Bluetooth Low Energy.

Additionally, according to certain embodiments, the presence sensors of each of end devices 120a-120j may, either by themselves, or under the control of master control device 105 form a self-configuring array of sensors, such as described in U.S. Provisional Patent Application No. 62/612,959, which is incorporated in by reference in its entirety.

According to certain embodiments HVAC system 125 is a "smart" HVAC device, such as one of the component devices of the Carrier Comfort Network system. According to other embodiments, HVAC system 125 is a conventional HVAC device that has been retrofitted with a networked controller capable of receiving control inputs from master control device 105. Skilled artisans will appreciate that HVAC system 125 is merely illustrative, and not limitative of the kinds of devices that can be controlled in response to inputs from master control device 105. Other devices of a "smart building" whose operation can be controlled or adjusted based on signals from master control device 105 include, without limitation, IoT devices such as lights, window shades, room cleaning robots, windows, automatic doors, media systems, and security systems.

Figure 2:
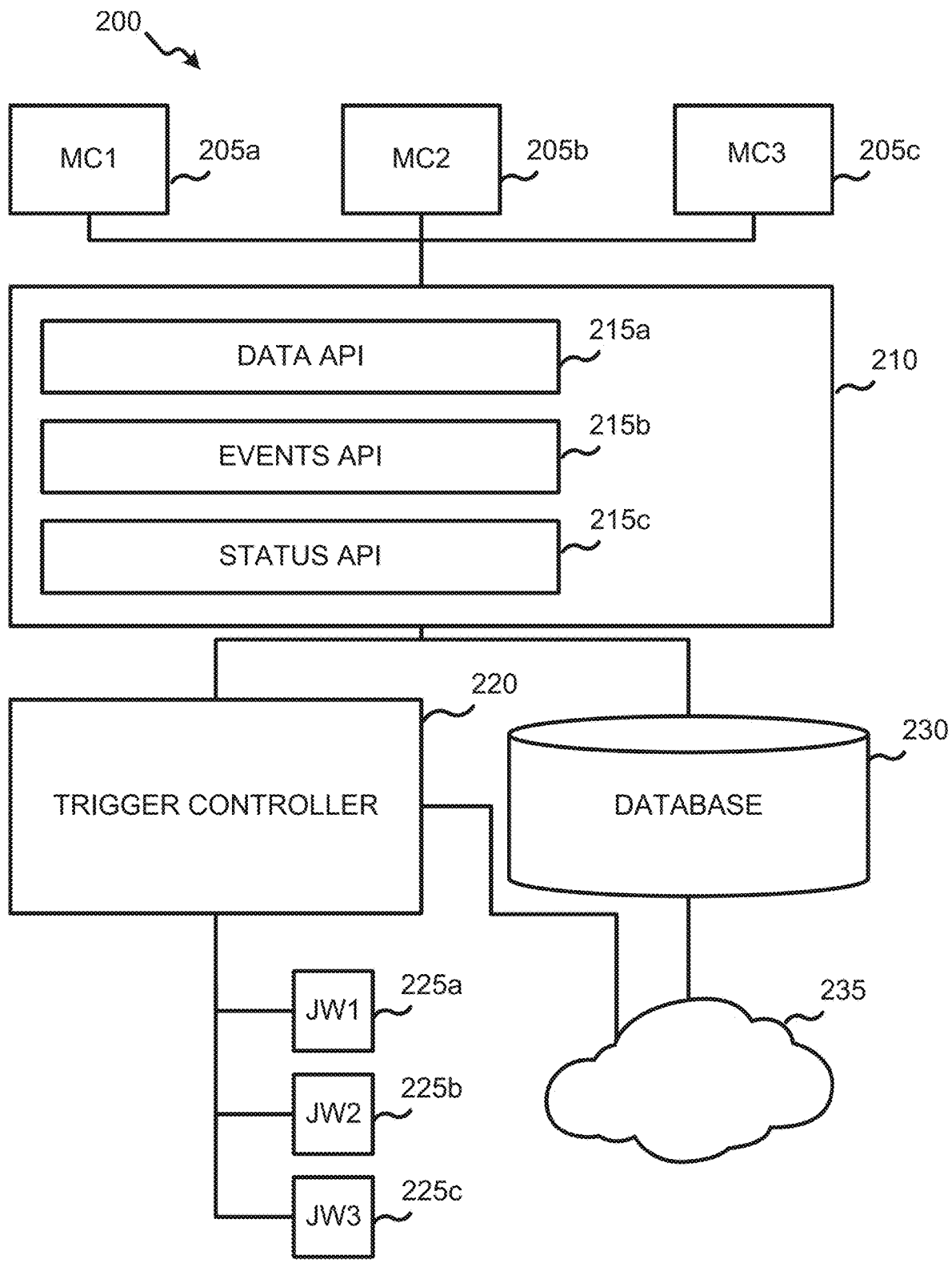
FIG. 2 illustrates a network and processing context for implementing a system and method for smart building control using directional occupancy sensing according to embodiments of this disclosure.

FIG. 2 illustrates an example of a network context 200 for implementing a system and method for smart building control using directional occupancy sensing according to certain embodiments of this disclosure. The embodiment of the network context 200 shown in FIG. 2 is for illustration only and other embodiments could be used without departing from the scope of the present disclosure.

In the non-limiting example shown in FIG. 2, a network context 200 includes one or more mat controllers 205a, 205b and 205c, an API suite 210, a trigger controller 220, job workers 225a-225d, a database 230 and a network 235.

According to certain embodiments, each of mat controllers 205a-205c is connected to a presence sensor in a physical space. In some embodiments, each of mat controllers 205 is a mat controller, such as described in U.S. Provisional Patent Application No. 62/615,310, the contents of which are incorporated in their entirety herein. According to some embodiments, each of mat controllers 205a-205c is an end device, such as one of end devices 120a-120j described with reference to FIG. 2 herein. Mat controllers 205a-205c generate floor contact data from presence sensors in a physical space and transmit the generated floor contact data to API suite 210. In some embodiments, data from mat controllers 205a-205c is provided to API suite 210 as a continuous stream. In the non-limiting example shown in FIG. 2, mat controllers 205a-205c provide the generated floor contact data to API suite 210 via the internet. Other embodiments, wherein mat controllers 205a-205c employ other mechanisms, such as a bus or Ethernet connection to provide the generated floor data to API suite 210 are possible and within the intended scope of this disclosure.

According to some embodiments, API suite 210 is embodied on a server computer connected via the internet to each of mat controllers 205a-205c. According to some embodiments, API suite is embodied on a master control device, such as master control device 105 shown in FIG. 1 of this disclosure. In the non-limiting example shown in FIG. 2, API suite 210 comprises a Data Application Programming Interface (API) 215a, an Events API 215b and a Status API 215c.

In some embodiments, Data API 215a is an API for receiving and recording mat data from each of mat controllers 205a-205c. Mat events include, for example, raw, or minimally processed data from the mat controllers, such as the time and data a particular sensor was pressed and the duration of the period during which the sensor was pressed. According to certain embodiments, Data API 215a stores the received mat events in a database such as database 230. In the non-limiting example shown in FIG. 2, some or all of the mat events are received by API suite 210 as a stream of event data from mat controllers 205a-205c, Data API 215a operates in conjunction with trigger controller 220 to generate and pass along triggers breaking the stream of mat event data into discrete portions for further analysis.

According to various embodiments, Events API 215b receives data from mat controllers 205a-205c and generates lower-level records of instantaneous contacts where a sensor on the mat is pressed and released.

In the non-limiting example shown in FIG. 2, Status API 215c receives data from each of mat controllers 205a-205c and generates records of the operational health (for example, CPU and memory usage, processor temperature, whether all of the sensors from which a mat controller receives inputs is operational) of each of mat controllers 205a-205c. According to certain embodiments, status API 215c stores the generated records of the mat controllers' operational health in database 230.

According to some embodiments, trigger controller 220 operates to orchestrate the processing and analysis of data received from mat controllers 205a-205c. In addition to working with data API 215a to define and set boundaries in the data stream from mat controllers 205a-205c to break the received data stream into tractably sized and logically defined "chunks" for processing, trigger controller 220 also sends triggers to job workers 225a-225c to perform processing and analysis tasks. The triggers comprise identifiers uniquely identifying each data processing job to be assigned to a job worker. In the non-limiting example shown in FIG. 2, the identifiers comprise: 1.) a sensor identifier (or an identifier otherwise uniquely identifying the location of contact); 2.) a time boundary start identifying a time in which the mat went from an idle state (for example, an completely open circuit, or, in the case of certain resistive sensors, a baseline or quiescent current level) to an active state (a closed circuit, or a current greater than the baseline or quiescent level); and 3.) a time boundary end defining the time in which a mat returned to the idle state.

In some embodiments, each of job workers 225a-225c corresponds to an instance of a process performed at a computing platform, (for example, master control device 105 in FIG. 1) for determining tracks and performing an analysis of the tracks. Instances of processes may be added or subtracted depending on the number of events or possible events received by API suite 210 as part of the data stream from mat controllers 205a-205c. According to certain embodiments, job workers 225a-225c perform an analysis of the data received from mat controllers 205a-205c, the analysis having, in some embodiments, two stages. A first stage comprises deriving paths, or tracks from mat impression data. A second stage comprises characterizing those paths according to a certain criteria to, inter alia, provide metrics to an online dashboard (in some embodiments, provided by a UI on a client device, such as client device 115 in FIG. 1) and to generate control signals for devices (such as HVAC systems, lights, and internet of things "IoT" appliances) controlling operational parameters of a physical space where the mat impressions were recorded.

In the non-limiting example shown in FIG. 2, job workers 225a-225c perform the constituent processes of a method for analyzing mat impressions to generate paths, or tracks. According to certain embodiments, the method comprises the operations of obtaining impression data from database 230, cleaning the obtained impression data and reconstructing paths using the cleaned data. In some embodiments, cleaning the data includes removing extraneous sensor data, removing gaps between impressions caused by sensor noise, removing long impressions caused by objects placed on mats or by defective sensors, and sorting impressions by start time to produce sorted impressions. According to certain embodiments, job workers 225a-225c perform processes for reconstructing paths by implementing algorithms that first cluster impressions that overlap in time or are spatially adjacent. Next, the clustered data is searched, and pairs of impressions that start or end within a few milliseconds of one another are combined into footsteps, which are then linked together to form footsteps. Footsteps are further analyzed and linked to create paths.

According to certain embodiments, database 230 provides a repository of raw and processed mat impression data, as well as data relating to the health and status of each of mat controllers 205a-205c. In the non-limiting example shown in FIG. 2, database 230 is embodied on a server machine communicatively connected to the computing platforms providing API suite 210, trigger controller 220, and upon which job workers 225a-225c execute. According to other embodiments, database 230 is embodied on a cloud computing platform.

In the non-limiting example shown in FIG. 2, the computing platforms providing trigger controller 220 and database 230 are communicatively connected to one or more network(s) 235. According to embodiments, network 235 comprises any network suitable for distributing mat data, determined paths and control signals based on determined paths, including, without limitation, the internet or a local network (for example, an intranet) of a smart building.

Figure 3:
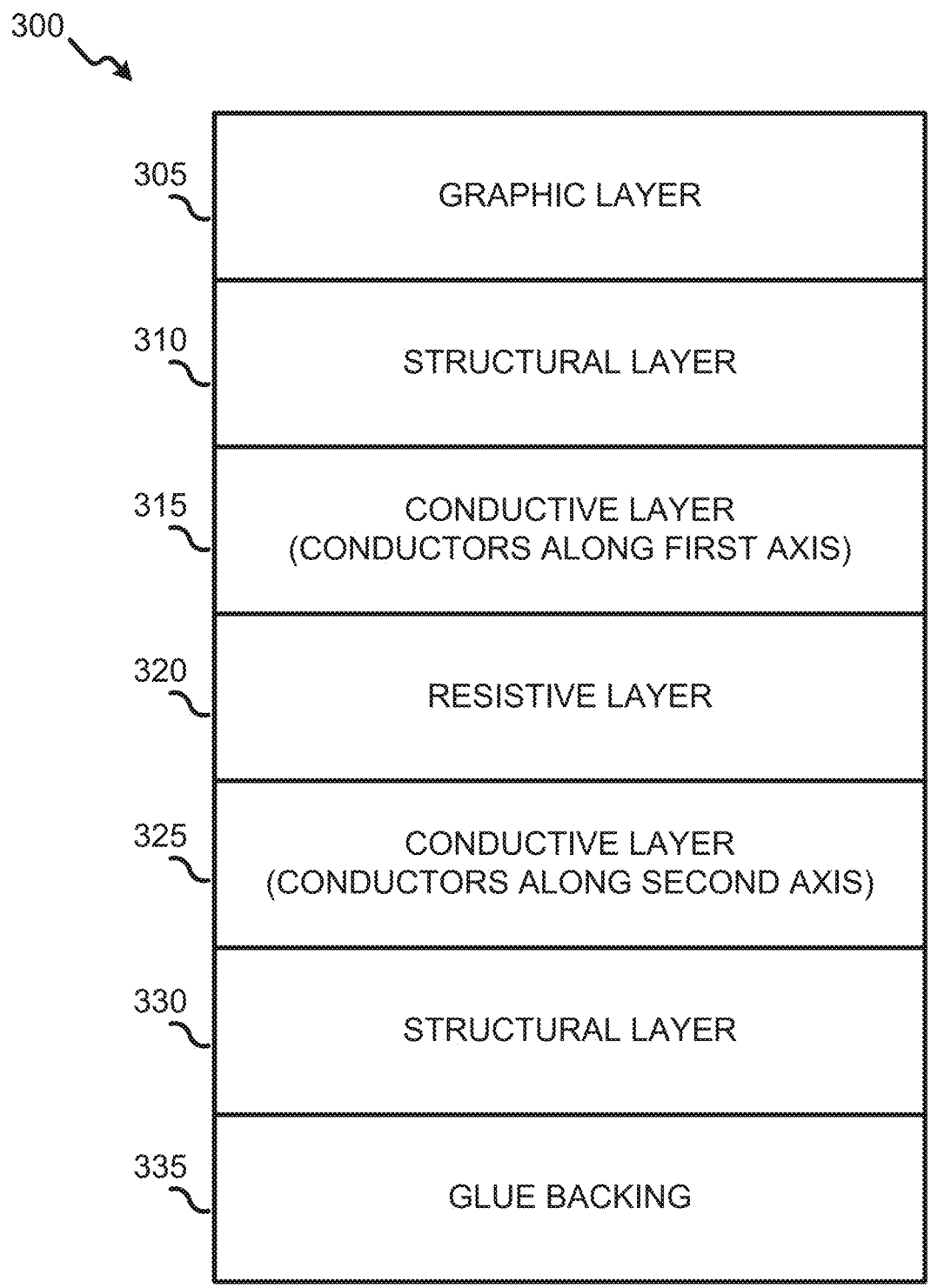
FIG. 3 illustrates aspects of a resistive mat presence sensor according to embodiments of this disclosure.

Presence sensors utilizing a variety of sensing technologies, such as membrane switches, pressure sensors and capacitive sensors, to identify instances of contact with a floor are within the contemplated scope of this disclosure. FIG. 3 illustrates aspects of a resistive mat presence sensor 300 according to certain embodiments of the present disclosure. The embodiment of the resistive mat presence sensor 300 shown in FIG. 3 is for illustration only and other embodiments could be used without departing from the scope of the present disclosure.

In the non-limiting example shown in FIG. 3, a cross section showing the layers of a resistive mat presence sensor 300 is provided. According to some embodiments, the resistance to the passage of electrical current through the mat varies in response to contact pressure. From these changes in resistance, values corresponding to the pressure and location of the contact may be determined. In some embodiments, resistive mat presence sensor 300 may comprise a modified carpet or vinyl floor tile, and have dimensions of approximately 2'×2'.

According to certain embodiments, resistive mat presence sensor 300 is installed directly on a floor, with graphic layer 305 comprising the top-most layer relative to the floor. In some embodiments, graphic layer 305 comprises a layer of artwork applied to presence sensor 300 prior to installation. Graphic layer 305 can variously be applied by screen printing or as a thermal film.

According to certain embodiments, a first structural layer 310 is disposed, or located, below graphic layer 305 and comprises one or more layers of durable material capable of flexing at least a few thousandths of an inch in response to footsteps or other sources of contact pressure. In some embodiments, first structural layer 310 may be made of carpet, vinyl or laminate material.

According to some embodiments, first conductive layer 315 is disposed, or located, below structural layer 310. According to some embodiments, first conductive layer 315 includes conductive traces or wires oriented along a first axis of a coordinate system. The conductive traces or wires of first conductive layer 315 are, in some embodiments, copper or silver conductive ink wires screen printed onto either first structural layer 310 or resistive layer 320. In other embodiments, the conductive traces or wires of first conductive layer 315 are metal foil tape or conductive thread embedded in structural layer 310. In the non-limiting example shown in FIG. 3, the wires or traces included in first conductive layer 315 are capable of being energized at low voltages on the order of 5 volts. In the non-limiting example shown in FIG. 3, connection points to a first sensor layer of another presence sensor or to mat controller are provided at the edge of each presence sensor 300.

In various embodiments, a resistive layer 320 is disposed, or located, below conductive layer 315. Resistive layer 320 comprises a thin layer of resistive material whose resistive properties change under pressure. For example, resistive layer 320 may be formed using a carbon-impregnated polyethylene film.

In the non-limiting example shown in FIG. 3, a second conductive layer 325 is disposed, or located, below resistive layer 320. According to certain embodiments, second conductive layer 325 is constructed similarly to first conductive layer 315, except that the wires or conductive traces of second conductive layer 325 are oriented along a second axis, such that when presence sensor 300 is viewed from above, there are one or more points of intersection between the wires of first conductive layer 315 and second conductive layer 325. According to some embodiments, pressure applied to presence sensor 300 completes an electrical circuit between a sensor box (for example, mat controller 225a shown in FIG. 2 or master control device 105 shown in FIG. 1) and presence sensor, allowing a pressure-dependent current to flow through resistive layer 320 at a point of intersection between the wires of first conductive layer 315 and second conductive layer 325.

In some embodiments, a second structural layer 330 resides beneath second conductive layer 325. In the non-limiting example shown in FIG. 3, second structural layer 330 comprises a layer of rubber or a similar material to keep presence sensor 300 from sliding during installation and to provide a stable substrate to which an adhesive, such as glue backing layer 335 can be applied without interference to the wires of second conductive layer 325.

The foregoing description is purely descriptive and variations thereon are contemplated as being within the intended scope of this disclosure. For example, in some embodiments, presence sensors according to this disclosure may omit certain layers, such as glue backing layer 335 and graphic layer 305 described in the non-limiting example shown in FIG. 3.

According to some embodiments, a glue backing layer 335 comprises the bottom-most layer of presence sensor 300. In the non-limiting example shown in FIG. 3, glue backing layer 335 comprises a film of a floor tile glue, such as Roberts 6300 pressure sensitive carpet adhesive.

Figure 4:
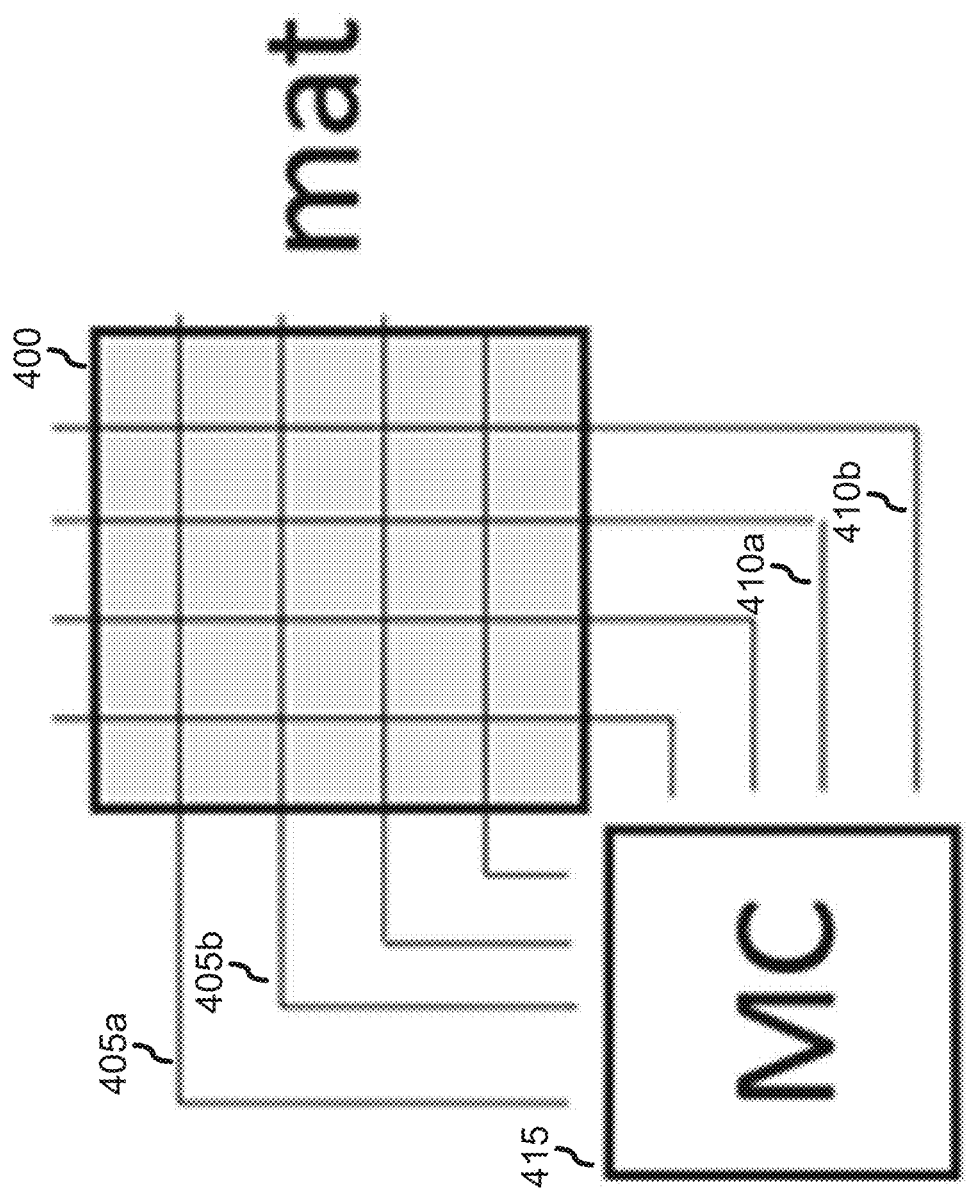
FIG. 4 illustrates aspects of a floor-mounted presence sensor according to embodiments of this disclosure.

FIG. 4 illustrates aspects of a floor mounted presence sensor according to various embodiments of this disclosure.

The embodiment of the floor mounted presence sensor 400 shown in FIG. 4 is for illustration only and other embodiments could be used without departing from the scope of the present disclosure.

In the non-limiting example shown in FIG. 4, a resistive mat presence sensor 400 has a plurality of conductive traces, including the traces numbered 405a and 405b, along a first axis, which, in this example, correspond to conductive traces in a first conductive layer (for example, conductive layer 315 in FIG. 3) of a resistive mat presence sensor. Further, resistive mat presence sensor 400 has a plurality of conductive traces, including the traces numbered 410a and 410 b, along a second axis, which, in this example, correspond to conductive traces in a second conductive layer (for example, conductive layer 325 in FIG. 3) of a resistive mat presence sensor. Each of conductive traces connects separately to an end device. In this case, the end device is a mat controller 415 (for example, mat controller 205a shown in FIG. 2). Other embodiments, in which the end device is, for example, end device 120a shown in FIG. 1 or master control device 105 shown in FIG. 1 are possible and within the scope of this disclosure.

In the non-limiting example shown in FIG. 4, presence sensor 400 is shown as connecting directly with mat controller 415. In other embodiments, presence sensor 400 connects to mat controller 415 through one or more additional presence sensors.

According to certain embodiments, the alignment and spacing of the conductive traces of the presence system correspond to the spatial increments of a coordinate system for a physical space in which the presence sensor is installed. For example, in some cases, the conductive wires are disposed within the conductive layers of the presence sensor at intervals of approximately three inches or less, as such as spacing provides a high resolution representation of the occupancy and traffic within the physical space.

According to certain embodiments, when pressure is applied (such as by a footstep) to the presence sensor, the resistive mat is compressed such that the electrical resistance between a trace in one layer of the resistive mat and a trace in another layer of the resistive mat is reduced, and a signal corresponding to the difference in electrical current from a baseline or quiescent value is observed (such as by an ammeter or voltmeter in mat controller 415) in the traces brought into proximity by the footstep. By identifying the traces of the presence sensor through which the difference in current is measured, a value in a coordinate space for the corresponding to the location where the pressure was applied to the pressure sensor can be mapped. Additionally, a value for the pressure applied to the mat at a given interval may be determined based on the size of the signal.

In the non-limiting example shown in FIG. 4, an end device, (for example, mat controller 415 or master control device 105 shown in FIG. 1) "scans" the voltages or currents observed at each of the terminals where traces of the presence sensors connect to the end device at predetermined intervals. Accordingly, a plurality of signals corresponding to the measured voltages or currents at each of the terminals at known times are recorded and passed to an input-output interface of the end device. According to some embodiments, the scan rate of approximately 100-200 Hertz (Hz), wherein the time between scans is on the order of 5-10 milliseconds (ms), is appropriate for capturing footstep data at a level of temporal granularity from which the directionality of footsteps can be determined. Faster and slower scan rates are possible and within the contemplated scope of this disclosure.

While in the non-limiting example shown in FIG. 4, traces 405a-b and 410a-b of presence sensor 400 are depicted as comprising part of a rectilinear coordinate system having uniformly sized spatial increments, the present disclosure is no so limited. Other embodiments are possible, such as embodiments in which one or more layers of traces are curved or fan shaped and define a radial coordinate system. Such embodiments may be advantageous for curving spaces, such as running tracks, velodromes or curved hallways. Additionally, in some embodiments, such as physical spaces that have defined spectator areas and performance areas (for example, a basketball court or a stage), it may be advantageous that the coordinate system have a finer spatial resolution in certain areas (such as the playing or performance area) and a coarser spatial resolution in other areas, such as hallways or concession stand areas.

Figure 5:
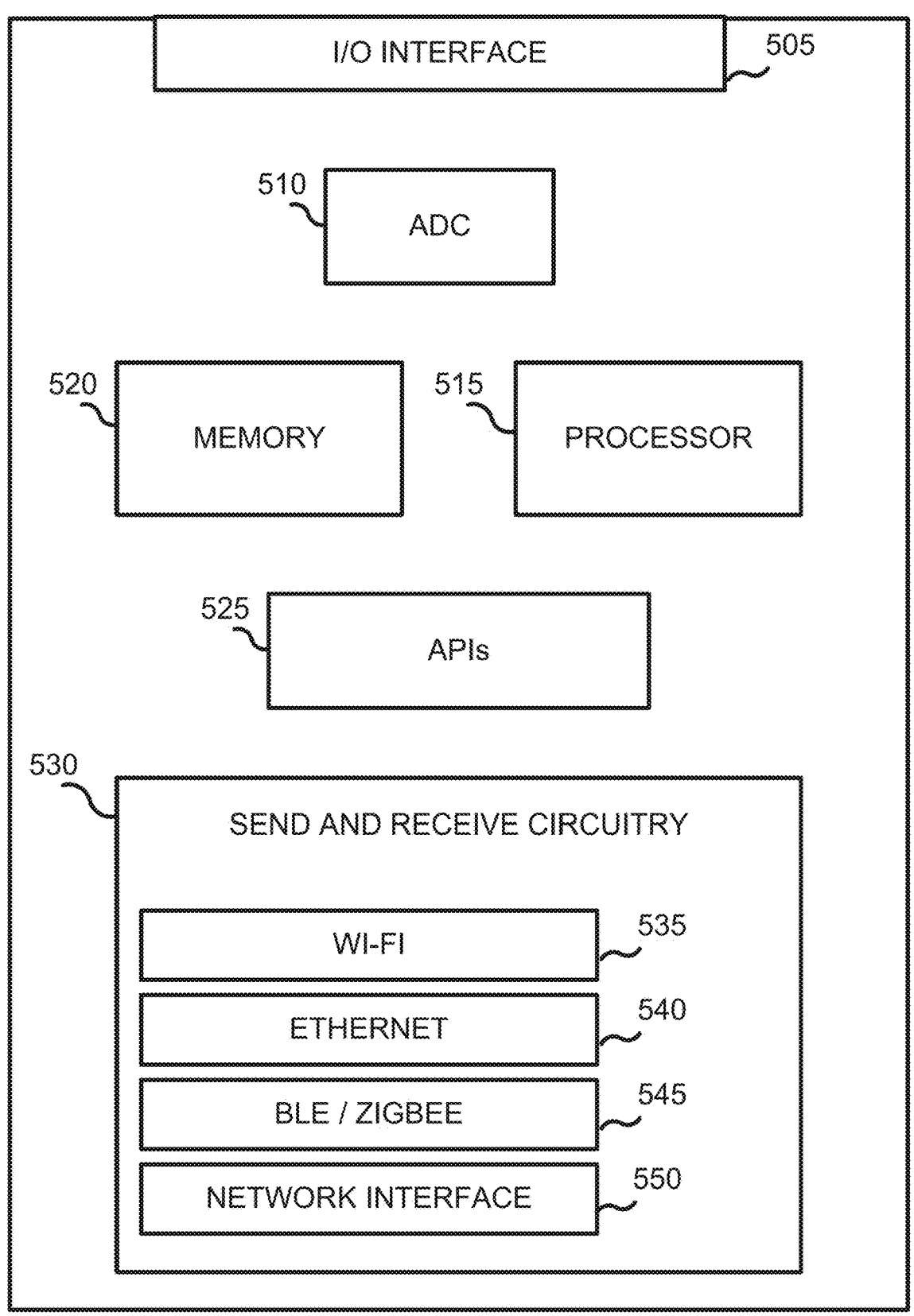
FIG. 5 illustrates a master control device according to embodiments of this disclosure.

FIG. 5 illustrates a master control device 500 according to certain embodiments of this disclosure. The embodiment of the master control device 500 shown in FIG. 5 is for illustration only and other embodiments could be used without departing from the scope of the present disclosure.

In the non-limiting example shown in FIG. 5, master control device 500 is embodied on a standalone computing platform (for example, master control device 105 in FIG. 1) connected, via a network, to a series of end devices (for example, 120a-120j in FIG. 1, mat controller 205a in FIG. 2) In other embodiments, master control device 105 connects directly to, and receives raw signals from, one or more presence sensors (for example, presence sensor 300 in FIG. 3 or presence sensor 400 in FIG. 4).

According to certain embodiments, master control device 500 includes one or more input/output interfaces (I/O) 505. In the non-limiting example shown in FIG. 5, I/O interface 505 provides terminals that connect to each of the various conductive traces of the presence sensors deployed in a physical space. Further, in systems where membrane switches or pressure sensing mats are used as presence sensors, I/O interface 505 electrifies certain traces (for example, the traces contained in a first conductive layer, such as conductive layer 315 in FIG. 3) and provides a ground or reference value for certain other traces (for example, the traces contained in a second conductive layer, such as conductive layer 325 in FIG. 3). Additionally, I/O interface 505 also measures current flows or voltage drops associated with occupant presence events, such as a person's foot squashing a membrane switch to complete a circuit, or compressing a resistive mat, causing a change in a current flow across certain traces. In some embodiments, I/O interface 505 amplifies or performs an analog cleanup (such as high or low pass filtering) of the raw signals from the presence sensors in the physical space in preparation for further processing.

In some embodiments, master control device 500 includes an analog-to-digital converter ("ADC") 510. In embodiments where the presence sensors in the physical space output an analog signal (such as in the case of resistive mats), ADC 510 digitizes the analog signals. Further, in some embodiments, ADC 510 augments the converted signal with metadata identifying, for example, the trace(s) from which the converted signal was received, and time data associated with the signal. In this way, the various signals from presence sensors can be associated with touch events occurring in a coordinate system for the physical space at defined times. While in the non-limiting example shown in FIG. 5, ADC 510 is shown as a separate component of master control device 500, the present disclosure is not so limiting, and embodiments wherein ADC 510 is part of, for example, I/O interface 505 or processor 515 are contemplated as being within the scope of this disclosure.

In various embodiments, master control device 500 further comprises a processor 515. In the non-limiting example shown in FIG. 5, processor 515 is a low-energy microcontroller, such as the ATMEGA328P by Atmel Corporation. According to other embodiments, processor 515 is the processor provided in other processing platforms, such as the processors provided by tablets, notebook or server computers.

In the non-limiting example shown in FIG. 5, master control device 500 includes a memory 520. According to certain embodiments, memory 520 is a non-transitory memory containing program code to implement, for example, APIs 525, networking functionality and the algorithms for generating and analyzing tracks described herein.

Additionally, according to certain embodiments, master control device 500 includes one or more Application Programming Interfaces (APIs) 525. In the non-limiting example shown in FIG. 5, APIs 525 include APIs for determining and assigning break points in one or more streams of presence sensor data and defining data sets for further processing. Additionally, in the non-limiting example shown in FIG. 5, APIs 525 include APIs for interfacing with a job scheduler (for example, trigger controller 220 in FIG. 2) for assigning batches of data to processes for analysis and determination of tracks. According to some embodiments, APIs 525 include APIs for interfacing with one or more reporting or control applications provided on a client device (for example, client device 115 in FIG. 1). Still further, in some embodiments, APIs 525 include APIs for storing and retrieving presence sensor data in one or more remote data stores (for example, database 230 in FIG. 2).

According to some embodiments, master control device 500 includes send and receive circuitry 530, which supports communication between master control device 500 and other devices in a network context in which smart building control using directional occupancy sensing is being implemented according to embodiments of this disclosure. In the non-limiting example shown in FIG. 5, send and receive circuitry 530 includes circuitry 535 for sending and receiving data using Wi-Fi, including, without limitation at 900 MHz, 2.8 GHz and 5.0 GHz. Additionally, send and receive circuitry 530 includes circuitry, such as Ethernet circuitry 540 for sending and receiving data (for example, presence sensor data) over a wired connection. In some embodiments, send and receive circuitry 530 further comprises circuitry for sending and receiving data using other wired or wireless communication protocols, such as Bluetooth Low Energy or Zigbee circuitry.

Additionally, according to certain embodiments, send and receive circuitry 530 includes a network interface 550, which operates to interconnect master control device 500 with one or more networks. Network interface 550 may, depending on embodiments, have a network address expressed as a node ID, a port number or an IP address. According to certain embodiments, network interface 550 is implemented as hardware, such as by a network interface card (NIC). Alternatively, network interface 550 may be implemented as software, such as by an instance of the java.net.NetworkInterface class. Additionally, according to some embodiments, network interface 550 supports communications over multiple protocols, such as TCP/IP as well as wireless protocols, such as 3G or Bluetooth.

FIG. 6 illustrates operations of a method 600 for determining tracks associated with moving occupants of a physical space according to various embodiments of this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps.

In the non-limiting example shown in FIG. 6, the operations of method 600 are carried out by "job workers" or processes orchestrated by a gateway or master control device (for example, master control device 500 in FIG. 5). Other embodiments are possible, including embodiments in which the described operations are performed across a variety of machines, including physical and virtual computing platforms.

According to some embodiments, method 600 includes operation 605, wherein a first plurality of electrical signals is received by an input/output interface (for example, I/O interface 505 in FIG. 5) of a master control device from presence sensors (for example, a self-configuring array of presence sensors, such as certain embodiments of end devices 120a-120j in FIG. 1) in a physical space under analysis. While not required, in some embodiments, the first plurality of electrical signals is received at multiple points in time, based on several scans of the presence sensors in the physical space by the master control device. Further, in the non-limiting example shown in FIG. 6, as part of operation 605, the received analog electrical signals may be digitized (for example, by ADC 510 in FIG. 5) and stored in a memory (for example, memory 520 in FIG. 5 or database 230 in FIG. 2).

In some embodiments, method 600 includes operation 610, wherein the master control device generates background sensor values. As part of operation 610, the master control device maps the presence sensor signals received at operation 605 to sensor values mapped to a coordinate system for the physical space (for example, the grid type coordinate system 800 in FIG. 8). In some cases, each trace of the presence sensor corresponds to a value on a coordinate axis for the physical space, and each intersection of traces corresponds to a "pixel" having a location in the physical space. The mapping of coordinate values comprises pairing the traces from which each signal of the first plurality of electrical signals was received to identify a "pixel," or location in the physical space associated with the received presence sensor signals.

In the non-limiting example shown in FIG. 6, background sensor values mapped to the coordinate system for the physical space are generated in one of at least two ways. In one set of embodiments, the first plurality of electrical signals is received over a time known to be a period of low activity in the physical space (for example, in cases where the physical space is a store, when the store is closed). In such cases, the sensor values collected during periods of inactivity may are assumed to be generated by furniture and other static actors in the space and comprise the background sensor values for the physical space. In another set of embodiments, the master control device categorizes the sensor values as "fast" and "slow" and maintains a running estimate of "foreground" and "background" sensor values by fitting two normal distributions to each pixel with "fast" and "slow" responses.

According to various embodiments, method 600 includes operation 615, wherein the master control device receives a second plurality of electrical signals comprising presence sensor signals at multiple points in time, such as presence sensor signals received from two or more "scans" of the presence sensors by the master control device. At operation 620, as in operation 605, the second plurality of electrical signals include an analog component that may be digitized (for example, by ADC 510 in FIG. 5) and stored in a memory (for example, memory 520 in FIG. 5 or database 230 in FIG. 2).

In some embodiments, method 600 includes operation 620, wherein the master control device generates, based on the second plurality of electrical signals from the presence sensors, sensor values mapped to "pixels" within the coordinate system and points in time. For example, a first sensor value generated in operation 620 may be of the general form: (time=10.01 s, x=2, y=4, Ground Pressure=30 lb/in$^2$), and a second sensor value generated in operation 620 may be of the general form (time=10.02 s, x=2, y=4, Ground Pressure=15 lb/in$^2$). In another embodiment, a first sensor value generated in operation 620 may be expressed as a string of the general form: (053104061), wherein the first four digits "0531" correspond to a time value, the fifth and sixth digits ("04") correspond to an angle in a radial coordinate system, the seventh and eighth digits ("06") correspond to a distance in the radial coordinate system, and the last digit ("1") corresponds to the measured state (for example, "on" or "off") of the presence sensor. Skilled artisans will appreciate that the foregoing examples of sensor values are purely illustrative, and other representations of location, time and presence sensor values are possible and within the intended scope of this disclosure.

In the non-limiting example shown in FIG. 6, method 600 is shown as including operation 625, wherein background sensor values (for example, the sensor values generated at operation 610 in FIG. 6) are subtracted from the sensor values generated at operation 620 to produce measurement data associated with the activities of the mobile occupants in the physical space. By subtracting out the background sensor values caused by, for example, furniture placed in the physical space after installation of presence sensors or damaged presence sensors, the master control device can obtain an unimpeded view of activity within the physical space.

According to some embodiments, method 600 includes operation 630, wherein the master control device associates measurement data (for example, the measurement data generated in operation 625) with one or more moving objects belonging to an object class. In the non-limiting example shown in FIG. 6, the density of traces (and spatial resolution) of the presence sensor is such that the sensor value at each pixel in the coordinate system can be examined in the context of neighboring sensors and time windows to classify the activity associated with the measurement data.

In certain embodiments, the master control device implements a classification algorithm that operates on the assumptions about the moving actors in the physical space. For example, in some embodiments, it is an operational assumption that footsteps form, persist on timescales on the order of one or two seconds, and then disappear. As a further example, it is an operational assumptions that wheels (such as from wheelchairs, bicycles, carts and the like) roll across a surface in a continuous motion. Working from predetermined rules, which in some embodiments, are based on operational assumptions, the measurement data can be associated with moving objects belonging to predefined object classes. In some embodiments, a tracker, corresponding to the location of the moving object in time is assigned to the moving object based on the measurement data. Further, according to some embodiments, trackers move from along tracks, which may be determined paths in a network of nodes in the coordinate system for the physical space.

In a non-limiting example, presence sensors are deployed in a physical space at a density that supports a spatial resolution of approximately 3 inches, and the master control device is configured to scan the presence sensors at intervals of approximately 5 ms (corresponding to a scan rate of 200 Hz). In this example, measurement data for a first point in the coordinate system correlating to a high applied pressure (for example, 200 psi) is generated for a time t=0. Over the course of the next 200 ms, the measurement data shows a decrease in applied pressure at the first point, and a moderate increase in pressure (for example, 20 psi) at one or more points adjacent to the first point. Applying predetermined rules, the master control device associates the generated measurement data with the footstep of a person wearing high heeled shoes and moving generally along a line passing through the first point and the one or more adjacent points.

In another non-limiting example, with the same scan rate and spatial resolution, at a first time, t=0 measurement data corresponding to a uniform applied pressure at five evenly spaced points in the coordinate system is generated. Over the course of the next five seconds, the measurement data shows five similarly spaced points of contact having approximately the same applied pressure values. Applying predetermined rules, the master control device associates the generated measurement data with the motion of an office chair on five caster wheels moving across the floor.

In some embodiments, method 600 includes operation 635, wherein the master control device identifies, based on the measurement data, a first node corresponding to a determined location of the moving object (for example, the moving object associated with an object class described with reference to operation 630). In the non-limiting example shown in FIG. 6, a node corresponds to a single value within the coordinate system corresponding to the location, at a given time, of a moving object in the physical space. In many cases, certain moving objects of interest in the physical space (for example, humans wearing shoes) contact the presence sensors at intermittent points in time at non-contiguous points of contact within the physical space. In such cases, nodes, or single points corresponding to the location of the actor, provide an analytical convenience and useful representation of the location associated with multiple pieces of measurement data.

According to some embodiments, a first node corresponding to a determined location of the moving object may be determined by applying a naïve clustering algorithm that clusters measurement data within a specified radius of a tracker and determines a node (such as by calculating a centroid associated with the measurement data) based on the measurement data within the cluster. In some cases, the specified radius is on the order of three feet.

In other embodiments, the first node is determined using another clustering algorithm, such as one of the clustering algorithms provided in the NumPy library. Examples of clustering algorithms suitable for generating the first node, include, without limitation, K-Means clustering, Affinity Propagation clustering, and the sklearn.cluster method.

In some embodiments, nodes may be assigned retroactively, based on the application of predetermined rules. For example, in cases where measurement data belonging to a first instance of a moving object class (for example, a footstep associated with a person wearing high-heeled shoes) is observed, a node may be assigned to the nearest door, based on a predetermined rule requiring that occupants of the physical space enter and exit via the doors.

According to various embodiments, method 600 includes operation 640, wherein the master control device generates, based on the measurement data at multiple time points, a track linking the first node (for example, the node determined during operation 635) with another node in the coordinate system for the physical space. In some embodiments, the generation of nodes is based on the application of a recursive algorithm to the measurement data, to smooth out the paths between nodes and to mitigate the effects of noise in the data. In the non-limiting example shown in FIG. 6, recursive algorithms for generating nodes may incorporate a predict/update step where an occupant's predicted location is used to update which footsteps are assigned to a tracker associated with the occupant. In one illustrative embodiment, up to two footsteps are assigned to each tracker. In some embodiments, nodes are generated by implementing a recursive estimation algorithm, such as a Kalman fitter (for example, the Kalman fitter described in FIG. 7).

In the non-limiting example shown in FIG. 6, the generated nodes are connected together in a network to form tracks associated with the path of moving objects and occupants of the physical space. According to some embodiments, the nodes are connected using a network algorithm (For example, the NetworkX package for Python) that generates a graph of nodes and edges connecting the nodes. In the non-limiting example shown in FIG. 6, after finding footsteps (and where, appropriate, wheels or other sources of impression data), these nodes are connected using the network algorithm. Further, to mitigate potential pileup effects, the network links or "edges" are pruned according to distance and time-based penalty terms to find unique tracks through the coordinate system associated with the physical space. In some cases, where there is ambiguity from pileup, track overlap can be represented by increasing the weight of the edges and by allowing tracks to merge and split.

In the non-limiting example shown in FIG. 6, method 600 is shown as including operation 645, wherein a signal associated with the determined track is outputted. According to some embodiments, the output signal may be a running tally of the number of determined tracks in the room, which corresponds generally to the number of occupants in the room. According to other embodiments, the output signal may comprise a plot of the determined tracks at a given time point, or a map of "hot spots" of high human traffic in the physical space. According to still other embodiments, the signal outputted at operation 645 is a control signal for an electrical appliance or other feature of the physical space (e.g., a window shade, door or lock) whose operation can be controlled or based at least in part on a signal from a master control device according to various embodiments of this disclosure. For example, in one embodiment, the determined tracks may show the occupants of a physical space moving towards a particular region of the space (for example, near a television or screen showing a news item or sporting event of broad interest), and the master control device may output a control signal to the HVAC system (for example, HVAC system 125 shown in FIGURE) increasing the power of the HVAC system in a particular region of the room.

FIG. 7 illustrates operations of a Kalman fitter 700 according to certain embodiments of this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The Kalman fitter 700 described with reference to the non-limiting example shown in FIG. 7 is one example of an algorithm for generating nodes encompassed by this disclosure. In some embodiments, Kalman fitter 700 provides the benefit of managing noise from the sensors and determining less "jittery" tracks associated with moving objects within the physical space.

According to some embodiments, Kalman fitter 700 is a recursive estimation algorithm and includes operation 705, wherein a master control device (for example, master control device 105 in FIG. 1) assigns a tracker to a moving object belonging to a determined object class. In some embodiments of this disclosure, a tracker corresponds to a point coordinate for a person, object or other moving entity of interest that contacts presence sensors at multiple points (for example, a mail cart on casters) or discontinuous intervals (for example, a walking human).

In some embodiments, Kalman fitter 700 includes operation 710, wherein the master control device receives measurement data (for example, a set of clustered impression data points corresponding to one or more possible directions of motion for the moving object that is being tracked) corresponding to the state of the moving object at a first time, $T_1$. Information regarding the state of the moving object at first time $T_1$ can include, without limitation, information as to the moving object's location, apparent direction of motion and apparent rate of motion. In some embodiments, the information as to the moving object's location, apparent direction and rate of motion is determined based on footstep and stride analysis of presence sensor data assumed by the master control device to be footsteps. In other embodiments, the measurement data corresponding to the state of the moving object at a time $T_1$ comprises only the moving object's location within the physical space.

In some embodiments, Kalman fitter 700 is a recursive estimation process, and operation 710 marks the start of a loop repeated for a period relevant to the operation of one or more environmental control systems of a physical space, or of other analytical interest (for example, the interval beginning when a tracker associated with a human being in the physical space is assigned, and ending when the human being is determined to have departed the physical space, such as by leaving the room).

In the non-limiting example shown in FIG. 7, Kalman fitter 700 includes operation 715, wherein the master control unit predicts, based on the measurement data corresponding to the state of the moving object at time $T_1$, measurement data corresponding to the state of the moving object at a subsequent time, $T_2$. As part of operation 715, the master control device may also determine an uncertainty value associated with the predicted measurement data at time $T_2$. In certain embodiments, the uncertainty associated with the predicted measurement data corresponding to the state of the moving object at time $T_2$, may be expressed as, or determined from an uncertainty matrix associated with the measurement data.

According to certain embodiments, Kalman fitter 700 includes operation 720, wherein the master control device receives measurement data corresponding to the state of the moving object at time $T_2$. In the non-limiting example shown in FIG. 7, the values of measurement data received as part of operation 720 correspond to fields of measurement data received at operation 710 and predicted at operation 715.

In some embodiments, Kalman fitter 700 further includes operation 725, wherein the master control device updates the measurement data corresponding to the moving object at time $T_2$ based on the predicted measurement data corresponding to the state of the moving object at time $T_2$. In certain embodiments, the updating of the recorded measurement data at time $T_2$ based on the predicted measurement data for time $T_2$ comprises taking a weighted average of the values of the recorded measurement data with the predicted values of the measurement data at time $T_2$. In the non-limiting example shown in FIG. 7, the relative weights of the recorded and predicted values of the measurement data is determined based on the uncertainty value or uncertainty matrix associated with the predicted value at operation 715. As noted elsewhere in this disclosure, in some embodiments, Kalman fitter 700 implements a recursive estimation method. According to such embodiments, after operation 725, the method returns to operation 710, using the updated values of the measurement data corresponding to the moving object at time $T_2$, as an initial value for a subsequent prediction.

FIGS. 8A-8I illustrate aspects of a method for determining tracks based on presence data according to certain embodiments of this disclosure. FIGS. 8A-8I illustrate activity in a coordinate system corresponding to a person entering a room and walking through the room, and how certain embodiments according to this disclosure determine a track corresponding to the person's motion into and through the room. Specifically, FIGS. 8A-8I depict activity in a coordinate system for the physical space (e.g., a room) beginning with an "empty" (noise and background presence sensor values) coordinate system for the physical space, followed by the detection of presence sensor data an initial time, assignment of a tracker, detection of additional presence sensor data at a subsequent time, and the determination of tracks connecting nodes within the coordinate system for the physical space.

Figure 8A:
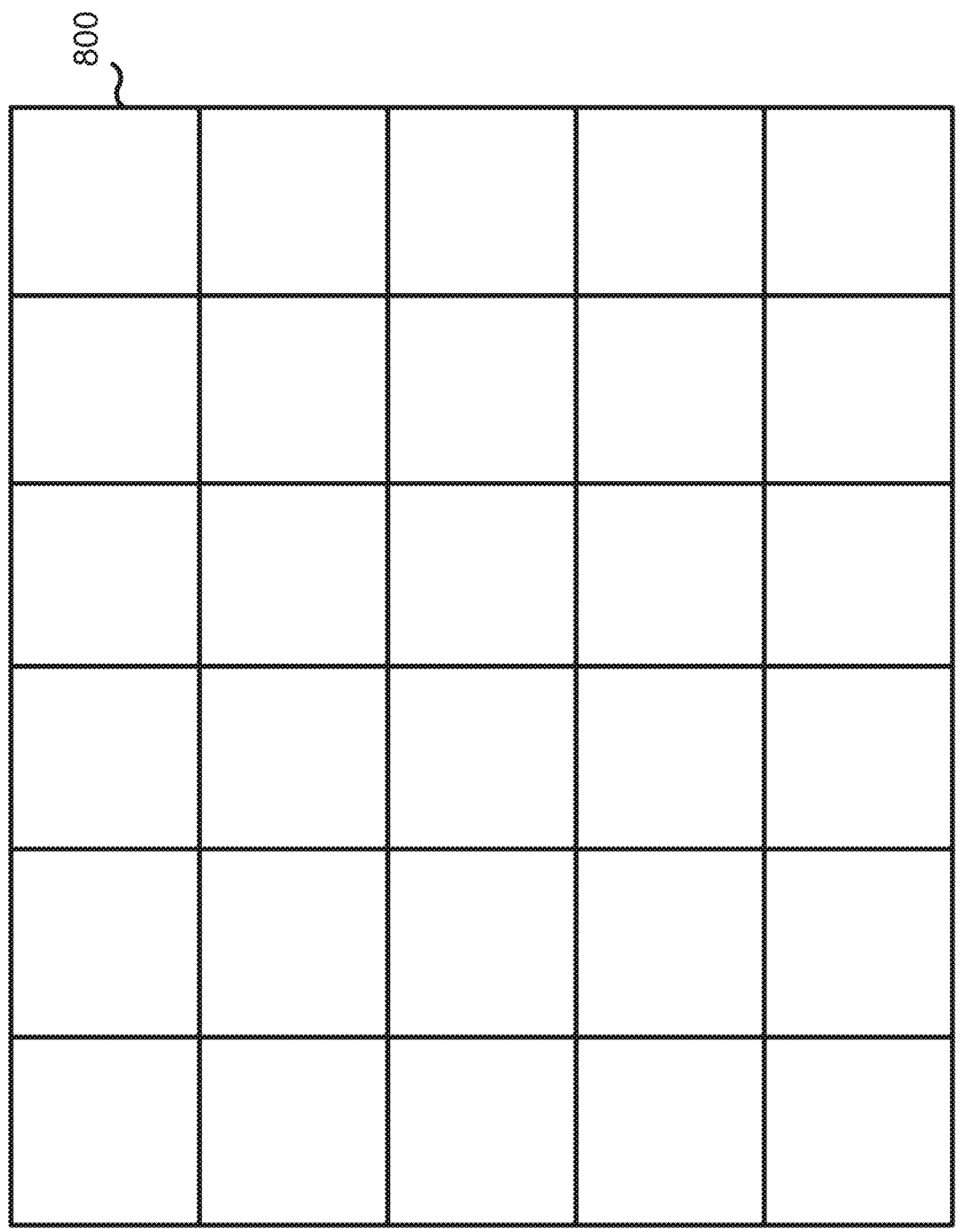

FIG. 8A depicts a coordinate system 800 for a physical space at an initial time. The embodiment of the coordinate system 800 shown in FIG. 8A is for illustration only and other embodiments could be used without departing from the scope of the present disclosure. In the non-limiting example shown in FIG. 8A, the axes of coordinate system 800 are based on the direction of the traces in two separate layers (for example, layers 315 and 325 shown in FIG. 3) of conductive mat presence sensors installed in the physical space. According to certain embodiments, coordinate system 800 provides a representation of the physical space after the "background" presence sensor values caused by furniture, noise and other factors have been subtracted out (for example, by performing operation 625 in FIG. 6).

FIG. 8B depicts activity in the coordinate system 800 for the physical space at a time subsequent to the time shown in FIG. 8A. The embodiment of the coordinate system 800 shown in FIG. 8B is for illustration only and other embodiments could be used without departing from the scope of the present disclosure. In the non-limiting example shown in FIG. 8B, a person has just entered the physical space and made her first footstep in the room. Measurement data 805 corresponding to electrical signals generated at one or more presence sensors in the physical space has been mapped to a location in the coordinate system 800 for the physical space. In this particular example, the measurement data 805 is represented as a shaded region, indicating that electrical signals were generated by presence sensors in the shaded region. Other representations of measurement data are possible, and include, without limitation, dots corresponding to overlap points between traces in of layers of a resistive mat through which a current or potential change was detected.

FIG. 8C depicts activity in the coordinate system 800 for the physical space subsequent to mapping measurement data 805 to a location in coordinate system 800. The embodiment of the coordinate system 800 shown in FIG. 8C is for illustration only and other embodiments could be used without departing from the scope of the present disclosure.

In the non-limiting example shown in FIG. 8C, measurement data 805 has been associated with a moving object belonging to an object class (in this particular example, a walking human), and a tracker 810 has been assigned to the moving object. In FIG. 8C, tracker 810 corresponds to a single point in the coordinate system (the single point is shown as a black dot within a dotted line included to help distinguish the tracker from other entities in coordinate system 800).

FIG. 8D depicts activity in the coordinate system 800 for the physical space subsequent to assigning a tracker to the human moving in the physical space. The embodiment of the coordinate system 800 shown in FIG. 8D is for illustration only and other embodiments could be used without departing from the scope of the present disclosure.

In the non-limiting example shown in FIG. 8D, the initial position of the tracker in the coordinate system 800 has been designated as a first node 815 and the start of a new track for the tracker assigned to the human moving in the physical space. Additionally, a master control device (for example, master control device 105 in FIG. 1) connected to the presence sensors in the physical space implements a Kalman fitter (for example, Kalman fitter 700 described with reference to FIG. 7) and predicts the location of the tracker at a subsequent time, $T_2$. In this particular example, the predicted position of the tracker at subsequent time $T_2$ is shown by unshaded circle 820.

In some embodiments, the recursion rate of a Kalman fitter is the same as the rate at which a master control device scans for electrical signals from presence sensors. In other embodiments, for example, where moving objects' interactions (such as footsteps) occur over intervals that are significantly longer than the scan rate, the recursion rate of a Kalman fitter may be lower than the scan rate for the presence sensors.

FIG. 8E depicts activity in the coordinate system 800 for the physical space at time $T_2$. At time $T_2$, additional measurement data 825 associated with the tracked human has been received and mapped to a location within the coordinate system 800 for the physical space. The embodiment of the coordinate system 800 shown in FIG. 8E is for illustration only and other embodiments could be used without departing from the scope of the present disclosure.

FIG. 8F depicts activity in the coordinate system 800 for the physical space at a time subsequent to time $T_2$. The embodiment of the coordinate system 800 shown in FIG. 8F is for illustration only and other embodiments could be used without departing from the scope of the present disclosure.

FIG. 8F depicts that tracker 810 has moved to a second node corresponding to a position for the tracked human determined based on the predicted position 820 of the tracked human at time $T_2$ and the measurement data 825 received at time $T_2$. In the non-limiting example shown in FIG. 8F, the location of the second node to which tracker 810 has been moved is determined based on a weighted average of the predicted position 820 and measurement data 825, wherein the weighting is based, at least in part, on an uncertainty value determined for predicted position 820.

According to certain embodiments, the master control device performs a determination as to whether the newly determined position of tracker 810 satisfies one or more predetermined conditions, such as expected changes time or distance between nodes or conditions indicating possible pileups of nodes or tracks. If the predetermined conditions are determined to have been satisfied, the master control device creates track 830 connecting the first and second nodes.

Figure 8G:
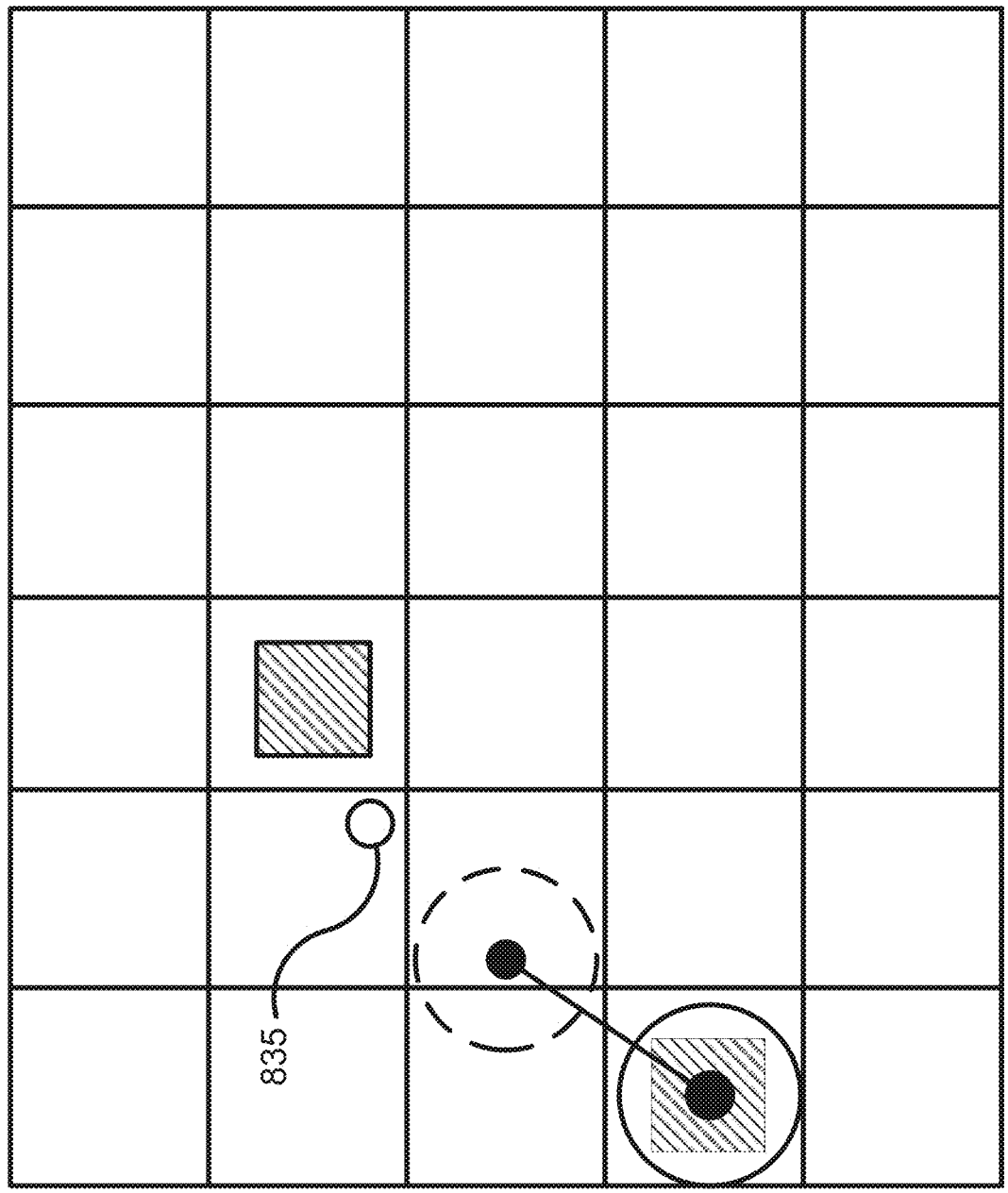

FIG. 8G depicts activity in the coordinate system 800 for the physical space at the start of a new recursion of the Kalman fitter, in which the predicted location 835 of the moving human in the physical space at a new subsequent time $T_3$ is determined based on the position of tracker 810 at time $T_2$. The embodiment of the coordinate system 800 shown in FIG. 8G is for illustration only and other embodiments could be used without departing from the scope of the present disclosure.

FIG. 8H depicts activity in the coordinate system 800 for the physical space at time $T_3$. The embodiment of the coordinate system 800 shown in FIG. 8H is for illustration only and other embodiments could be used without departing from the scope of the present disclosure.

At time $T_3$, the master control device receives additional measurement data 840 from presence sensors and maps the additional measurement data 840 to a location within the coordinate system 800 for the physical space. Additionally, the master control device applies a clustering algorithm (for example, one of the clustering algorithms described with reference to operation 635 in FIG. 6) that clusters measurement data 825 and 840 based on their physical and temporal proximity of the measurement data and assigns a point coordinate for the clustered measurement data 845. For the purposes of implementing the Kalman fitter, the point coordinate for the clustered measurement data 845 is the measurement data for time $T_3$.

FIG. 8I depicts activity in the coordinate system 800 for the physical space at a time subsequent to time $T_3$. The embodiment of the coordinate system 800 shown in FIG. 8I is for illustration only and other embodiments could be used without departing from the scope of the present disclosure.

In the non-limiting example shown in FIG. 8I, the tracker moves to a new node determined based on a weighted average of the predicted location of the moving human at time $T_3$ and the clustered measurement data. Further, the master control device performs a determination as to whether the newly determined position of tracker 810 satisfies one or more predetermined conditions, such as expected changes time or distance between nodes or conditions indicating possible pileups of nodes or tracks. If the predetermined conditions are determined to have been satisfied, the master control device creates track 850 connecting the first and second nodes.

According to certain embodiments, the method described with reference to FIGS. 8A-8I recurs until a terminal condition, such as a determination that the tracked human has left the physical space, is satisfied. Further, in some embodiments, the master control device outputs the determined tracks, data derived from the determined tracks, or control signals (such as turning a light on or off) based on the determined tracks.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A non-transitory computer readable medium having stored thereon, program code, which when executed by a processor, causes a master control device to perform operations comprising:
   receiving, at a input-output interface of the master control device, a first plurality of electrical signals from presence sensors disposed in a physical space, the presence sensors associated with a coordinate system for the physical space, the master control device comprising a processor, a memory and the input-output interface,
   generating, based on the first plurality of electrical signals from the presence sensors, background sensor values mapped to a coordinate system for the physical space,
   receiving, at the input-output interface of the master control device, a second plurality of electrical signals from the presence sensors, the second plurality of electrical signals received from at a first time and a second time,
   generating, based on the second plurality of electrical signals from the presence sensors, sensor values mapped to the coordinate system for the physical space at the first time and the second time,
   subtracting the background sensor values from the sensor values mapped to the coordinate system at the first time and the second time to obtain measurement data,
   associating the measurement data with a moving object belonging to an object class,
   identifying, based on the measurement data, a first node corresponding to a determined location of the moving object within the coordinate system for the physical space,
   determining a track, based on the measurement data, the track comprising a link between a first node and another node in the coordinate system for the physical space, and
   outputting, via the input-output interface of the master control device, a signal associated with the determined track.

2. The non-transitory computer readable medium of claim 1, wherein the signal associated with the determined track controls an operation of an electrical or electronic appliance in the physical space.

3. The non-transitory computer readable medium of claim 1, having stored thereon, program code that, when executed by the processor, causes the master control device to perform operations comprising:
   identifying the first node by applying a naïve clustering algorithm to the measurement data.

4. The non-transitory computer readable medium of claim 1, having stored thereon, program code that, when executed by the processor, causes the master control device to perform operations comprising:
   assigning a tracker to the first node.

5. The non-transitory computer readable medium of claim 4, having stored thereon program code that, when executed by the processor, causes the master control device to perform operations comprising:
   implementing a Kalman fitter to determine the determined track.

6. The non-transitory computer readable medium of claim 1, having stored thereon program code that, when executed by the processor, causes the master control device to perform operations comprising:
   determining the track by applying a network algorithm to the measurement data.

* * * * *